US012698232B2

(12) United States Patent
Xiao et al.

(10) Patent No.: US 12,698,232 B2
(45) Date of Patent: Aug. 4, 2026

(54) FOLDABLE COVER ARTICLE WITH REDUCED HAZARDOUS PROJECTIONS

(71) Applicant: SCHOTT Glass Technologies (Suzhou) Co. Ltd., Suzhou (CN)

(72) Inventors: Wei Xiao, Shanghai (CN); Feng He, Suzhou (CN); Ning Da, Suzhou (CN)

(73) Assignee: SCHOTT Glass Technologies (Suzhou) Co. Ltd., Suzhou (CN)

( * ) Notice: Subject to any disclaimer, the term of this patent is extended or adjusted under 35 U.S.C. 154(b) by 300 days.

(21) Appl. No.: 17/831,874

(22) Filed: Jun. 3, 2022

(65) Prior Publication Data

US 2022/0298064 A1 Sep. 22, 2022

Related U.S. Application Data

(63) Continuation of application No. PCT/CN2019/122786, filed on Dec. 3, 2019.

(51) Int. Cl.
*C03C 17/28* (2006.01)
*B32B 7/12* (2006.01)
(Continued)

(52) U.S. Cl.
CPC ............... *C03C 17/28* (2013.01); *B32B 7/12* (2013.01); *B32B 17/10* (2013.01); *B32B 27/281* (2013.01);
(Continued)

(58) Field of Classification Search
CPC ........... B32B 2255/26; B32B 2315/08; B32B 2457/20
See application file for complete search history.

(56) References Cited

U.S. PATENT DOCUMENTS 8,142,894 B2 3/2012 Shimatani et al.
10,809,766 B2 10/2020 Chu et al.
(Continued)

FOREIGN PATENT DOCUMENTS

CN 105271795 A 1/2016
CN 110289271 A 9/2019
WO WO-2017123899 A1 * 7/2017 ............. B32B 17/00

OTHER PUBLICATIONS

Rubio et al. (Optical Materials 27 pp. 1266-129; Organic-inorganic hybrid coating (poly(methyl methacrylate)/monodisperse silica)) (Year: 2005).*

(Continued)

*Primary Examiner* — Alicia J Weydemeyer
(74) *Attorney, Agent, or Firm* — TAYLOR & EDELSTEIN, PC

(57) ABSTRACT

A foldable cover article has a total thickness $t \leq 300$ μm, which is bendable to a minimum bending radius $r \leq 20$ mm without breakage and a pencil hardness $HR \geq HB$. The foldable cover article includes a glass or glass-ceramic substrate with a thickness 5 μm $\leq t1 \leq 150$ μm and a polymer layer and/or a hard material coating with a total thickness 5 μm $\leq t2 \leq 150$ μm. For each 20 mm width of the foldable cover article, when the foldable cover article is broken upon bending along the direction perpendicular to the width, a number of projections with a longest linear extension $L \geq 5$ mm is less than 10 and/or a number of projections with a longest linear extension $L < 5$ mm is less than 50.

19 Claims, 20 Drawing Sheets

(51) Int. Cl.

| | |
|---|---|
| *B32B 17/10* | (2006.01) |
| *B32B 27/28* | (2006.01) |
| *B32B 27/36* | (2006.01) |
| *C03C 17/00* | (2006.01) |
| *C03C 17/30* | (2006.01) |
| *C03C 17/32* | (2006.01) |
| *C03C 21/00* | (2006.01) |

(52) U.S. Cl.

CPC ............ *B32B 27/36* (2013.01); *C03C 17/007* (2013.01); *C03C 17/009* (2013.01); *C03C 17/30* (2013.01); *C03C 17/32* (2013.01); *C03C 21/00* (2013.01); *B32B 2250/02* (2013.01); *B32B 2255/26* (2013.01); *B32B 2307/536* (2013.01); *B32B 2307/54* (2013.01); *B32B 2307/546* (2013.01); *B32B 2307/558* (2013.01); *B32B 2307/732* (2013.01); *B32B 2315/08* (2013.01); *B32B 2333/12* (2013.01); *B32B 2363/00* (2013.01); *B32B 2367/00* (2013.01); *B32B 2379/08* (2013.01); *B32B 2383/00* (2013.01); *B32B 2457/20* (2013.01); *C03C 2217/445* (2013.01); *C03C 2217/478* (2013.01); *C03C 2218/116* (2013.01); *C03C 2218/118* (2013.01); *C03C 2218/152* (2013.01); *C03C 2218/365* (2013.01)

(56) References Cited

U.S. PATENT DOCUMENTS

| | | | |
|---|---|---|---|
| 2011/0132643 A1 | 6/2011 | Hattori et al. | |
| 2016/0002103 A1* | 1/2016 | Wang | B23K 26/0624 |
| | | | 428/141 |
| 2016/0215165 A1* | 7/2016 | Arakawa | C08J 5/18 |
| 2017/0036242 A1* | 2/2017 | Lee | C08J 7/046 |
| 2017/0096364 A1 | 4/2017 | Ottermann et al. | |
| 2017/0338182 A1* | 11/2017 | Gross | H10K 77/111 |
| 2018/0155238 A1 | 6/2018 | Kim et al. | |
| 2019/0011954 A1 | 1/2019 | Chu et al. | |
| 2020/0398530 A1 | 12/2020 | Kuo et al. | |
| 2021/0070650 A1 | 3/2021 | Da et al. | |
| 2021/0217975 A1 | 7/2021 | Gu et al. | |
| 2021/0375167 A1 | 12/2021 | Lin | |

OTHER PUBLICATIONS

Japanese Office Action dated Jun. 6, 2023 for Japanese Patent Application No. 2022-533129 (3 pages).

English translation of Japanese Office Action dated Jun. 6, 2023 for Japanese Patent Application No. 2022-533129 (3 pages).

International Search Report dated Sep. 3, 2020 for International Application No. PCT/CN2019/122786 (5 pages).

Written Opinion of the International Searching Authority dated Sep. 3, 2020 for International Application No. PCT/CN2019/122786 (5 pages).

Chinese Office Action dated Sep. 26, 2023 for Chinese Patent Application No. 201980102733.7 (7 pages).

English translation of Chinese Office Action dated Sep. 26, 2023 for Chinese Patent Application No. 201980102733.7 (7 pages).

\* cited by examiner

1'

~~~~~ 200'

1'                           1'

301'              302'
201'              202'

0.7 pen

~10 cm 3, 3'

2, 2'

Tape

R = 2.8 cm

FOLDABLE COVER ARTICLE WITH REDUCED HAZARDOUS PROJECTIONS

CROSS REFERENCE TO RELATED APPLICATIONS

This is a continuation of International Patent Application Publication No. PCT/CN2019/122786 entitled "FOLDABLE COVER ARTICLE WITH REDUCED HAZARDOUS PROJECTS", filed on Dec. 3, 2019, which is incorporated in its entirety herein by reference.

BACKGROUND OF THE INVENTION

1. Field of the Invention

The present invention relates to a foldable cover article in the applications of substrate or cover of a display, fragile sensors, fingerprint sensor module or thin film battery, semiconductor package or foldable display.

2. Description of the Related Art

Recently, as technology develops, the cover article of consumer devices, such as TV, mobile phone and so on, gradually uses glass, due to its transparent property, light weight, increasing toughness and so on. Optical transparency and thermal stability are often important properties for flexible display applications. In addition, flexible displays should have high fatigue and puncture resistance, including resistance to failure at small bending radii, particularly for flexible displays that have touch screen functionality and/or can be folded.

Conventional flexible glass materials offer many of the needed properties for flexible substrate and/or display applications. However, efforts to harness glass materials for these applications have been largely unsuccessful to date. Generally, glass substrates can be manufactured to very low thickness levels (<25 μm) to achieve smaller and smaller bend radii. These "thin" glass substrates suffer from limited puncture resistance. At the same time, thicker glass substrates (>150 μm) can be fabricated with better puncture resistance, but these substrates lack suitable fatigue resistance and mechanical reliability upon bending.

In addition, due to the aesthetic viewpoint, the cover article is required to be foldable to a dome shape or arc shape. Foldable glass substrates for foldable electronic device applications, while offering improvements in transparency, stability and wear resistance over polymeric foils, can be limited by impact resistance. More particularly, impact resistance concerns for foldable glass substrates can be manifested in damage to the substrate and/or underlying electronic components when subjected to impacts or bending.

For a folded cover article made of glass in the art, it is generally chemically toughened. However, when the chemically toughened folded glass breaks, the stored tensile energy is mainly dissipated by cracks and projections, which might cause damage or hurt to the user. Because the new surface energy created by cracks is very limited, projections are seemingly inevitable, and thus, it is desirable to reduce the projections when broken. It was found that, an efficient approach to dissipate the released tensile energy during breakage is by introducing another material—polymer. Then, the tensile energy could be dissipated by delamination of the polymer film, plastic deformation of the polymer film around the force concentrated area, viscoelastic deformation of the polymer film between the small glass pieces, etc. But typical polymers have very low hardness. Therefore, it is desirable to provide a foldable cover article with enough hardness so as to be scratch-resistant. Then, it was proposed that a hard material coating is introduced for increasing the hardness of the foldable cover article. However, the flexibility could be an issue for the hard material coating when reaching a small bending radius. All in all, the thickness of the polymer layer and the hard coating are all essential for flexibility and mechanical performance: small thickness could not provide sufficient protection or bonding to dissipate released tensile energy; large thickness could lead to large strain and cause hard coating failure when reaching small bending radius. Therefore, it is desirable to provide a foldable cover article with enough hardness and flexibility, which can also reduce the projections when broken upon bending or impact.

SUMMARY OF THE INVENTION

Exemplary embodiments disclosed herein provide a foldable cover article essentially made of glass substrate, which reduces the projections when broken upon bending or impact.

Exemplary embodiments disclosed herein also provide an optimized polymer/hard coating layer applied onto the glass substrate to control the frangibility of the foldable cover article while maintaining or even improving the desired mechanical properties of an ultrathin flexible display cover, e.g., flexibility.

In some embodiments provided according to the present invention, a foldable cover article has a total thickness t≤300 μm, which is bendable to a minimum bending radius r≤20 mm without breakage and a pencil hardness HR≥HB. The foldable cover article includes a glass or glass-ceramic substrate with a thickness 5 μm≤t1≤150 μm and a polymer layer and/or a hard material coating with a total thickness 5 μm≤t2≤150 μm. For each 20 mm width of the foldable cover article, when the foldable cover article is broken upon bending along the direction perpendicular to the width, a number of projections with a longest linear extension L≥5 mm is less than 10 and/or a number of projections with a longest linear extension L<5 mm is less than 50.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figures 1A, 1B, 1C, 1D, 1E, 1F, 1G, 1H, 1I, 1J:
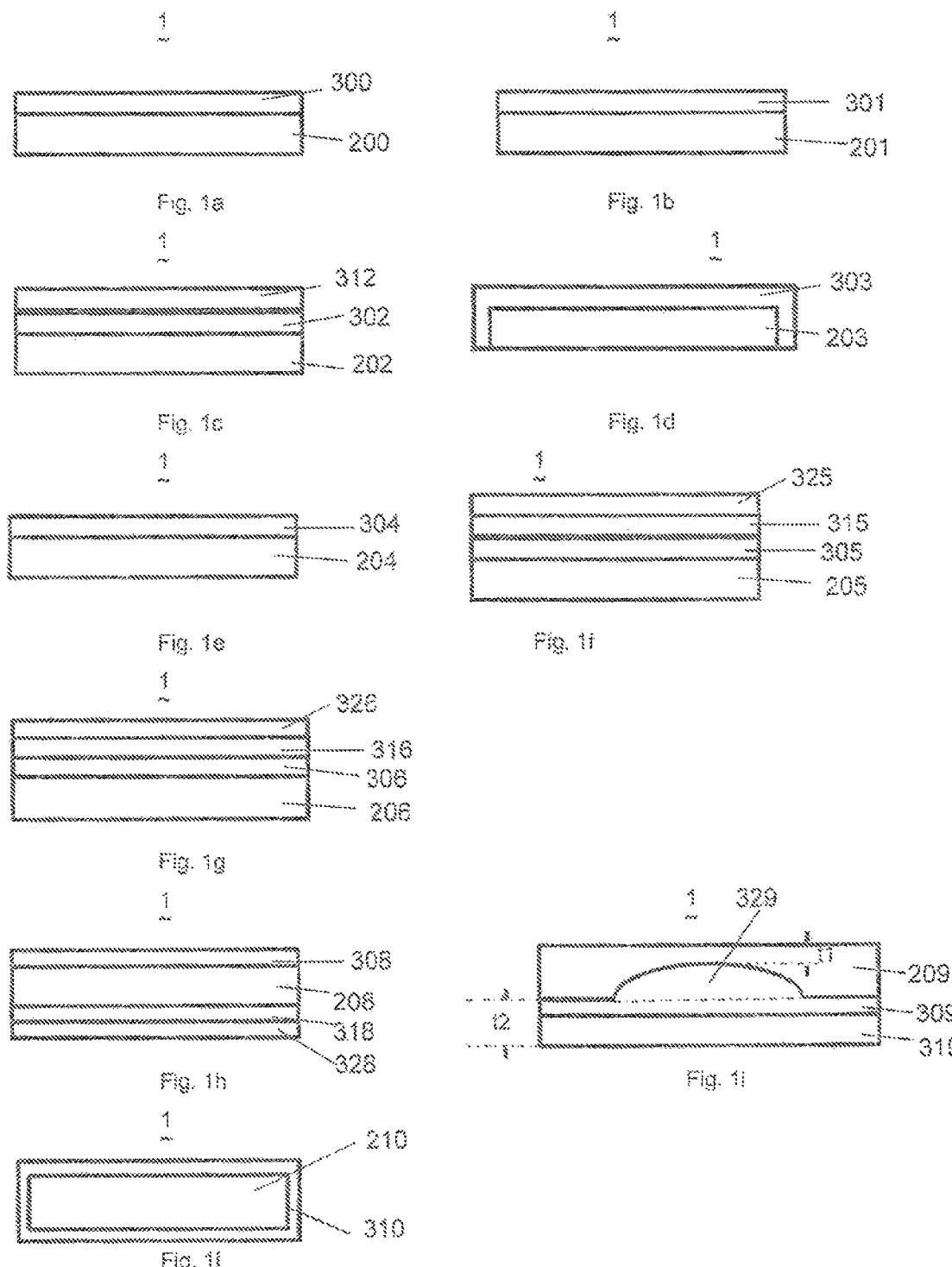
FIGS. 1a-1m are cross-sectional views of foldable cover articles provided according to an embodiment of the present invention as well as comparative foldable cover articles in the art.

In one aspect of the present invention, a foldable cover article is provided with a total thickness t≤300 μm, for example t≤250 μm, t≤200 μm, t≤150 μm, t≤100 μm, t≤85 μm, t≤70 μm, 50 μm, 40 μm, 30 μm, 20 μm, 10 μm or within a range having any two of these values as endpoints. For example, the foldable cover article may have a thickness t in the range of 300 μm to 10 μm, or from 300 μm to 20 μm, or from 300 μm to 30 μm, or from 300 μm to 40 μm, or from 300 μm to 50 μm, or from 300 μm to 70 μm, or from 300 μm to 85 μm, or from 300 μm to 100 μm, or from 300 μm to 150 μm, or from 300 μm to 200 μm, or from 300 μm to 250 μm, or from 250 μm to 10 μm, or from 200 μm to 10 μm, or from 150 μm to 10 μm, or from 100 μm to 10 μm, or from 85 μm to 10 μm, or from 70 μm to 10 μm, or from 50 μm to 10 μm, or from 40 μm to 10 μm, or from 30 μm to 10 μm, or from 20 μm to 10 μm. The foldable cover article is bendable to a minimum bending radius r≤20 mm, for example r≤15 mm, r≤10 mm, r≤8 mm, t≤6 mm, t≤5 mm, t≤4 mm, 3 mm, 2 mm, or 1.5 mm, without breakage and has a pencil hardness HR≥HB. The foldable cover article comprises a glass or glass-ceramic substrate with a thickness 5 μm≤t1≤150 μm; and a polymer layer and/or a hard material coating with a total thickness 5 μm≤t2≤150 μm. For each 20 mm width of the foldable cover article, when the foldable cover article is broken upon bending along the direction perpendicular to the width, the number of projections with a longest linear extension L≥5 mm is less than 10, for example less than 8, less than 6, less than 5, less than 4, or less than 3; and/or the number of projections with a longest linear extension L<5 mm is less than 50, for example less than 40, less than 30, less than 25, less than 20 or less than 15.

It has been found that, because of the low Young's modulus of the polymer layer compared to glass, it will shift the neutral plane and cause large strain for the out-most layer during bending. In order to maintain flexibility but greatly reduce hazardous projections from chemically toughened ultrathin glasses of the foldable cover article with a typical thickness t≤300 μm, for example t≤250 μm, t≤200 μm, t≤150 μm, t≤100 μm, t≤85 μm, t≤70 μm, 50 μm, 40 μm, 30 μm, 20 μm, or within a range having any two of these values as endpoints. For example, the foldable cover article may have a thickness t in the range of 300 μm to 10 μm, or from 300 μm to 20 μm, or from 300 μm to 30 μm, or from 300 μm to 40 μm, or from 300 μm to 50 μm, or from 300 μm to 70 μm, or from 300 μm to 85 μm, or from 300 μm to 100 μm, or from 300 μm to 150 μm, or from 300 μm to 200 μm, or from 300 μm to 250 μm, or from 250 μm to 10 μm, or from 200 μm to 10 μm, or from 150 μm to 10 μm, or from 100 μm to 10 μm, or from 85 μm to 10 μm, or from 70 μm to 10 μm, or from 50 μm to 10 μm, or from 40 μm to 10 μm, or from 30 μm to 10 μm, or from 20 μm to 10 μm. The thickness t1 of the glass or glass-ceramic substrate should be 5 μm≤t1≤150 μm and the total thickness of the polymer layer and/or hard material coating should be 5 μm≤t2≤150 μm.

Without the polymer layer, a 10 mm*20 mm area of the ultrathin glass or glass-ceramic substrate around the fracture origin during a bending could break into more than dozens of individual pieces, but with a polymer/hard coating layer as provided according to the invention, frangibility of the glass and number of individual pieces after fracture could be largely reduced to only a few pieces.

In some embodiments, the glass or glass-ceramic substrate is toughened and has a minimum bending radius r1 in millimeter r1≤100000*t1/CS; for example r1≤80000*t1/CS, r1≤70000*t1/CS, or r1≤60000*t1/CS, wherein CS is the compressive stress in MPa measured on both surface of the glass or glass-ceramic substrate.

In some embodiments, the glass or glass-ceramic substrate has a central tension CT≤700 MPa, for example CT≤500 MPa, CT≤300 MPa, CT≤100 MPa, or CT≤50 MPa, wherein CT is the central tension in MPa in the middle plane of the glass or glass-ceramic substrate.

It was surprising to find that the behavior of breakage of the foldable cover substrate is influenced by the depth of ion exchange DoL and central tensile stress CT generated by ion exchange process, if the glass substrate is chemically toughened. In some embodiments, the glass or glass-ceramic substrate is chemically toughened and has a depth of ion-exchange layer DoL≥1 μm, for example DoL≥2 μm or DoL≥3 μm, and/or DoL≤t1/2, for example DoL≤30 μm or DoL≤20 μm.

In some embodiments, the glass or glass-ceramic substrate has a two point bending strength BS≥700 MPa, for example BS≥800 MPa, BS≥1000 MPa, or BS≥1200 MPa.

In some embodiments, for each 20 mm width of the foldable cover article, the number of projections with a longest linear extension L≥5 mm is less than 10, for example less than 8, less than 6, less than 5, less than 4, or less than 3, when the foldable cover article is broken upon bending along the direction perpendicular to the width with the glass or glass-ceramic substrate or the side with thinner polymer layer and/or hard material coating on the convex side In some embodiments, for each 20 mm width of the foldable cover article, the number of projections with a longest linear extension L<5 mm is less than 50, for example less than 45, less than 40, less than 35, less than 30, or less than 20, when the foldable cover article is broken upon bending along the direction perpendicular to the width with the glass or glass-ceramic substrate or the side with thinner polymer layer and/or hard material coating on the convex side.

In some embodiments, when the foldable cover article is placed on the concave side of a polypropylene half ring with a radius of 4 cm with glass or glass-ceramic substrate or the side with thinner polymer layer and/or hard material coating on the convex side, and then hit by a ball-point pen with a diameter of ball of 0.7 mm and a weight of 6 g from 25 cm height, the whole article remains as one piece after the test.

In some embodiments, for a 20 mm*70 mm sample of the foldable cover article, when the foldable cover article is placed on a stainless steel cylinder with a radius of 2.8 cm with the glass or glass-ceramic substrate or the side with thinner polymer layer and/or hard material coating on the concave side, and then is hit by a ball-point pen with a diameter of ball of 0.7 mm and a weight of 6 g from 10 cm height, the amount of weight loss due to small projections is less than 10%, for example less than 9%, less than 8%, less than 7%, less than 6%, or less than 5%.

In some embodiments, when the foldable cover article is placed flatly on a marble stage with the glass or glass-ceramic substrate or the side with thinner polymer layer and/or hard material coating facing downwards, and then hit by a 32.5 g stainless steel ball from 40 cm height, the whole article remains as one piece.

In some embodiments, the glass or glass-ceramic substrate is laminated with a polymer layer or multiple polymer layers with a total thickness t3$p$ of 150 μm, 120 μm, 100 μm, 85 μm, 70 μm, 50 μm, 40 μm, 30 μm, 20 μm, 10 μm, 5 μm, 1 μm or within a range having any two of these values as endpoints. For example, the polymer layer or multiple polymer layers may have a total thickness t3$p$ in the range of 150 μm to 5 μm, or from 150 μm to 10 μm, or from 150 μm to 20 μm, or from 150 μm to 30 μm, or from 150 μm to 40 μm, or from 150 μm to 50 μm, or from 150 μm to 70 μm, or from 150 μm to 85 μm, or from 150 μm to 100 μm, or from 150 μm to 120 μm, or from 150 μm to 1 μm, or from 120 μm to 1 μm, or from 100 μm to 1 μm, or from 85 μm to 1 μm, or from 70 μm to 1 μm, or from 50 μm to 1 μm, or from 40 μm to 1 μm, or from 30 μm to 1 μm, or from 20 μm to 1 μm, or from 10 μm to 1 μm, or from 5 μm to 1 μm.

In some embodiments, the polymer layer or multiple polymer layers have a Young's modulus Ep of 10 GPa, 7 GPa, 6 GPa, 5 GPa, 4 GPa, 3 GPa, 2 GPa, 0.5 GPa, 0.4 GPa, 0.3 GPa, 0.2 GPa, 0.1 GPa or within a range having any two of these values as endpoints. For example, the polymer layer or multiple polymer layers may have a Young's modulus Ep in the range of 10 GPa to 0.2 GPa, or from 10 GPa to 0.3 GPa, or from 10 GPa to 0.4 GPa, or from 10 GPa to 0.5 GPa, or from 10 GPa to 2 GPa, or from 10 GPa to 3 GPa, or from 10 GPa to 4 GPa, or from 10 GPa to 5 GPa, or from 10 GPa to 6 GPa, or from 10 GPa to 7 GPa, or from 10 GPa to 0.1 GPa, or from 7 GPa to 0.1 GPa, or from 6 GPa to 0.1 GPa, or from 5 GPa to 0.1 GPa, or from 4 GPa to 0.1 GPa, or from 3 GPa to 0.1 GPa, or from 2 GPa to 0.1 GPa, or from 0.5 GPa to 0.1 GPa, or from 0.4 GPa to 0.1 GPa, or from 0.3 GPa to 0.1 GPa, or from 0.2 GPa to 0.1 GPa.

In some embodiments, the polymer layer or multiple polymer layers are made of, but not limited to, a polymer selected from Parylene, thermoplastic polyurethane (TPU), polycarbonate (PC), polysulfone (PS), polyethersulfone (PES), polyetheretherketone (PEEK), polyamide (PA), polyamideimide (PAI), polyimide (PI), poly(methyl methacrylate) (PMMA), polyimethylsiloxane (PDMS), or combinations thereof.

In some embodiments, at least one surface of the glass or glass-ceramic substrate is coated with a hard material coating or multiple hard material coatings with a total thickness t3$c$ of 150 μm, 120 μm, 100 μm, 85 μm, 70 μm, 50 μm, 40 μm, 30 μm, 20 μm, 10 μm, 5 μm, 1 μm or within a range having any two of these values as endpoints. For example, the hard material coating or multiple hard material coatings may have a total thickness t3$c$ in the range of 150 μm to 5 μm, or from 150 μm to 10 μm, or from 150 μm to 20 μm, or from 150 μm to 30 μm, or from 150 μm to 40 μm, or from 150 μm to 50 μm, or from 150 μm to 70 μm, or from 150 μm to 85 μm, or from 150 μm to 100 μm, or from 150 μm to 120 μm, or from 150 μm to 1 μm, or from 120 μm to 1 μm, or from 100 μm to 1 μm, or from 85 μm to 1 μm, or from 70

μm to 1 μm, or from 50 μm to 1 μm, or from 40 μm to 1 μm, or from 30 μm to 1 μm, or from 20 μm to 1 μm, or from 10 μm to 1 μm, or from 5 μm to 1 μm.

In some embodiments, the hard material coating or multiple hard material coatings have a Young's modulus Eh of 15 GPa, 13 GPa, 11 GPa, 9 GPa, 7 GPa, 4 GPa, 2 GPa, 1 GPa or within a range having any two of these values as endpoints. For example, the hard material coating or multiple hard material coatings may have a Young's modulus Eh in the range of 15 GPa to 2 GPa, or from 15 GPa to 4 GPa, or from 15 GPa to 7 GPa, or from 15 GPa to 9 GPa, or from 15 GPa to 11 GPa, or from 15 GPa to 13 GPa, or from 15 GPa to 1 GPa, or from 13 GPa to 1 GPa, or from 11 GPa to 1 GPa, or from 9 GPa to 1 GPa, or from 7 GPa to 1 GPa, or from 4 GPa to 1 GPa, or from 2 GPa to 1 GPa.

In some embodiments, the hard material coating or hard material coatings are made of, but not limited to, organic polymer materials, e.g. acrylates and their modified forms, or inorganic-organic hybrid polymer materials, e.g., polysiloxanes and their modified forms; PMMA with inorganic nanoparticles; epoxy-siloxane hybrids.

In some embodiments, the foldable cover article has a pencil hardness less than 8H on the side laminated with the polymer layer and/or the hard material coating.

In some embodiments, the foldable cover article has a breakage height Ha≥Hg*2, for example Ha≥hg*3, Ha≥Hg*4, Ha≥hg*5, Ha≥hg*6, Ha≥Hg*7, Ha≥Hg*8, Ha≥Hg*9, or Ha≥Hg*10, wherein Hg is the breakage height of the glass substrate, and the breakage height is determined in pen drop test, in which foldable article is placed on a stage composed of 25 μm OCA, 50 μm PET, 25 μm OCA, 50 μm PET and 30 cm marble from top to bottom, with the glass or glass-ceramic substrate side or the side with thinner polymer and/or hard material coating facing downwards and bonded to top OCA layer of the stage, and the pen is ballpoint pen with a diameter of 0.5 mm and a weight of 13 g.

In some embodiments, the foldable cover article has a breakage force Fab≥2 Fgb, for example Fab≥5 Fgb, Fab≥10 Fgb, Fab≥20 Fgb, Fab≥40 Fgb, Fab≥60 Fgb, Fab≥80 Fgb, or Fab≥100 Fgb, wherein Fgb is the breakage force of the glass substrate and the breakage force is determined in a sandpaper of P180 press test in which the foldable article is placed with the glass or glass-ceramic substrate side or the side with thinner polymer layer and/or hard material coating on a steel plate and the other surface is loaded until breakage by a steel rod having a diameter of 3 mm at its flat front face wherein a sandpaper of type P180 is attached to the flat front face of the steel rod and the abrasive side of the sandpaper is in contact with the top surface of the foldable cover article.

In some embodiments, the foldable cover article has a breakage height of at least the breakage force of the glass substrate multiplied by 2, for example multiplied by 5, multiplied by 10, multiplied by 20, multiplied by 50, multiplied by 100, multiplied by 150, or multiplied by 200, wherein the breakage height is determined in a sandpaper ball drop test in which the glass article is placed with its glass or glass ceramic side or the side with thinner polymer/coating on a steel plate and the other surface is loaded until breakage by a 4.5 g acrylic ball dropped from above wherein a sandpaper of type P180 is place on the top surface of the foldable cover article and the abrasive side of the sandpaper is in contact with the top surface of the foldable cover article.

In another aspect of the present invention, a foldable cover article is provided in the use of the foldable cover article according to any of the preceding embodiments in the applications of substrate or cover of a display, fragile sensors, substrate or cover of fingerprint sensor module, semiconductor package, substrate or cover of a thin film battery, foldable display.

Referring now to the drawings, FIGS. 1a-1j show the cross-sectional views of the foldable cover articles provided according to the present invention and the comparative foldable cover articles in the art. Below, examples provided according to the present invention and comparative examples are introduced. In the following example, the glass substrate is an ultrathin glass (UTG), which is commercially available with the brand AS 87 eco aluminosilicate glass from SCHOTT AG, with a Young's modulus of 73.3 GPa and a pencil hardness of 9H. Please be noted that the glass substrate can be made of different glass, such as silicate glass, soda-lime glass, borosilicate glass and so on.

The examples below provided according to the present invention are just exemplary. However, the foldable cover article can also include different number of layers/coatings on one side/two sides as described below.

Example 1

FIG. 1a shows a foldable cover article 1 including a glass substrate 200 and a Parylene layer 300 applied on the glass substrate 200 by chemical vapor deposition (CVD) method. In this example, the glass substrate 200 has a thickness $t2g=0.07$ mm and the Parylene layer 300 has a thickness $t3p$ in a range from 8 to 10 $\mu$m and has a Young's Elastic modulus Ep in a range from 2 to 3 GPa.

Example 2

FIG. 1b shows a foldable cover article 1 including a glass substrate 201 and a hard material coating 301 applied on the glass substrate 201 by slot die method. In this example, the glass substrate 201 has a thickness $t2g=0.07$ mm and the hard material coating 301 is made of a polymer selected from PMMA with nanoparticles (such as SiO2 particles) or Epoxy-siloxane hybrid with a Young's modulus Ep in a range from 4 to 6 GPa. The hard material coating 301 has a thickness $t3c$ in a range from 19 to 22 $\mu$m.

Example 3

FIG. 1c shows a foldable cover article 1 including a glass substrate 202 and a polyimide (PI) layer 302 and a hard material coating 312 applied on the glass substrate 202 by roll-to-roll micro-gravure method. In this example, the glass substrate 202 has a thickness $t2g=0.07$ mm and the hard material coating 312 is made of a polymer selected from PMMA or hybridized material of PMMA and siloxane with a Young's modulus Ep2 in a range from 4 to 6 GP. The PI layer 302 has a Young's modulus Ep1 in a range from 5 to 8 GPa and a thickness $t3p$ of 50 $\mu$m. The hard material coating has a thickness $t3c$ of 10 $\mu$m.

Example 4-1

FIG. 1d shows a foldable cover article 1 including a glass substrate 203 and a hard material coating 305 applied on the glass substrate 203 by spin coating process. In this case, the edges of the glass substrate 203 are encapsulated by the hard material coating 303. In this example, the glass substrate 203 has a thickness $t2g=0.07$ mm and the hard material coating 303 is made of a polymer of polymethyl methacrylate with SiO$_2$ nanoparticles. The hard material coating 303 is applied on the glass substrate 203 via spin-coating method with a thickness $t3c$ of 30 $\mu$m and has a Young's modulus Ec of 3.16 GPa.

Example 4-2

FIG. 1e shows a foldable cover article 1 including a glass substrate 204 and a hard material coating 304 applied on the glass substrate 204 by spin coating process. In this case, the edges of the glass substrate 204 are not encapsulated by the hard material coating 304. In this example, the glass substrate 204 has a thickness $t2g=0.07$ mm and the hard material coating 304 is a polymer of polymethyl methacrylate with SiO$_2$ nanoparticles. The hard material coating 304 is applied on the glass substrate 204 via spin-coating method with a thickness $t3c$ of 30 $\mu$m and has a Young's modulus Ec of 3.16 GPa.

Example 5

In Example 5, the foldable cover article 1 has the same structure as Example 2 shown in FIG. 1b, with the only difference in that the hard material coating has a Young's modulus Ep in a range from 2 to 3 GPa.

Example 6

FIG. 1f shows a foldable cover article 1 including a glass substrate 205 and a hard material coating 305, a polyimide (PI) layer 315 and an optical clear adhesive (OCA) coating 325 applied on the glass substrate 205. In this case, the hard material coating 305 is made of a polymer of polymethyl methacrylate with SiO$_2$ nanoparticles and the OCA coating 325 is made of an OCA commercially available as Tesa® 69401 produced by Tesa. In this example, the glass substrate 205 has a thickness $t2g=0.07$ mm and the hard material coating 305 has a thickness of 10 $\mu$m and the PI layer 315 has a thickness of 50 $\mu$m and a Young's modulus Ep in a range from 5 to 8 GPa. The OCA coating 325 has a Young's modulus Ec of less than 0.001 GPa and a thickness $t3c$ of 25 $\mu$m.

Example 7

FIG. 1g shows a foldable cover article 1 including a glass substrate 206 and a hard material coating 306, an optical clear adhesive (OCA) coating 316 and a PET layer 326 applied on the glass substrate 206. In this case, the hard material coating 306 is made of a polymer of polymethyl methacrylate with SiO$_2$ nanoparticles and the OCA coating 326 is made of an OCA commercially available as Tesa® 69401 produced by Tesa. In this example, the glass substrate 206 has a thickness $t2g=0.07$ mm and the hard material coating 306 has a thickness of 30 $\mu$m. The OCA layer 316 has a thickness of 25 $\mu$m and a Young's modulus Ep in a range from 0.001 GPa. The PET layer 326 has a thickness $t3c$ of 25 $\mu$m.

Example 8

FIG. 1h shows a foldable cover article 1 including a glass substrate 208 and a hard material coating 308 applied on one side of the glass substrate 208 by spin coating process. On the other side of the glass substrate 208, a pressure sensitive adhesive (PSA) coating 318 and a polyethylene terephthalate (PET) layer 328 are provided. In this case, glass substrate 208 is made of a glass commercially available as SCHOTT AS87 eco and has a thickness of 70 μm. The hard material coating 308 has a thickness of 25 μm. The PSA coating 318 has a thickness of 25 μm and the PET layer 318 has a thickness of 25 μm.

Example 9

FIG. 1*i* shows a foldable cover article 1 including a glass substrate 209 and a colorless polyimide (CPI) layer 319 bonded to the substrate 209 with an OCA coating 309. In this example, the glass substrate 209 is gradually thinned by acid etched and the thinned part of the glass substrate 209 is filled with OCA coating 309. The glass substrate 209 has a thickness t1=50 μm at the thinnest portion thereof and except the thinned part, the glass substrate 209 has a thickness of 145 μm. Except the part of the OCA coating 309 filled in the thinned part of the glass substrate 209, the OCA coating 309 has a thickness of 25 μm. Further, the CPI layer 319 has a thickness of 50 μm. In this case, the glass substrate 209 has a good foldability at the thinnest portion even the glass substrate generally has a large thickness, and thus the foldable cover article 1 has a good foldability.

Example 10

FIG. 1*j* shows a foldable cover article 1 including a glass substrate 210 and a colorless polyimide (CPI) layer 310 bonded to the substrate 210. In this example, the glass substrate 209 is completely encapsulated by the CPI layer 310, forming a capsule structure. The glass has a thickness t1=70 μm and the CPI layer 310 has a thickness of 50 μm.

Comparative Example 1

Figures 1K, 1L, 1M:
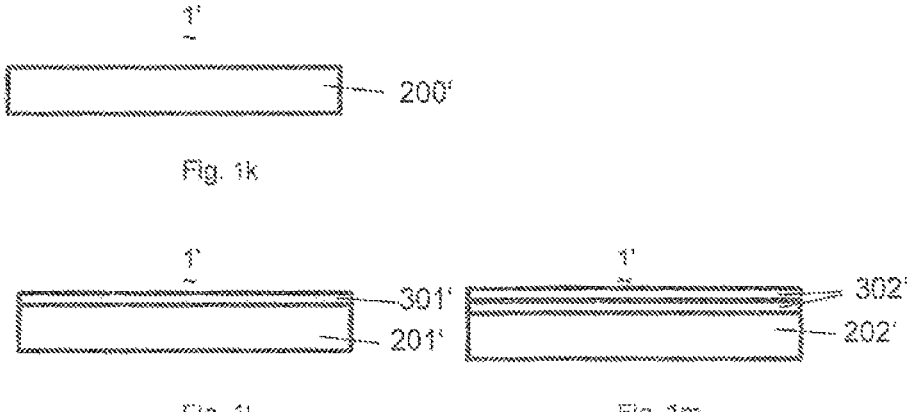

FIG. 1*k* shows a foldable cover article 1' including a glass substrate 200' without any polymer layer or coatings.

Comparative Example 2

FIG. 1*l* shows a foldable cover article 1' including a glass substrate 201' and a parylene layer 301' applied on the glass substrate 201' by a PVD or CVD process. In this example, the glass substrate has a thickness t2'g=0.07 mm and the parylene layer 301' has a thickness tp in a range from 3 to 5 μm and has a Young's Elastic modulus Ep in a range from 2 to 3 GPa.

Comparative Example 3

FIG. 1*m* shows a foldable cover article 1' including a glass substrate 202' and two coatings of hard material 302' applied on the glass substrate 202' by dip coating process. In this example, the glass substrate 202' has a thickness t2'g=0.07 mm and each of the coating of hard material 302' is made of a polymer selected from PMMA or hybridized material of PMMA and siloxane with a Young's modulus Ep2 in a range from 4 to 6 GP and a thickness t2 of 5 μm.

Please be noted that, in the above examples, for the purpose of better comparison, the materials for glass substrate, hard material coating, PET layer, PI layer, CPI layer, PSA layer and OCA are respectively the same, unless there is a specific definition. Further, the thickness t1 of the glass substrate generally means that of the thinnest portion thereof, if the glass substrate does not have a constant thickness.

Test 1: 2 PB Out Folding

Figure 2:
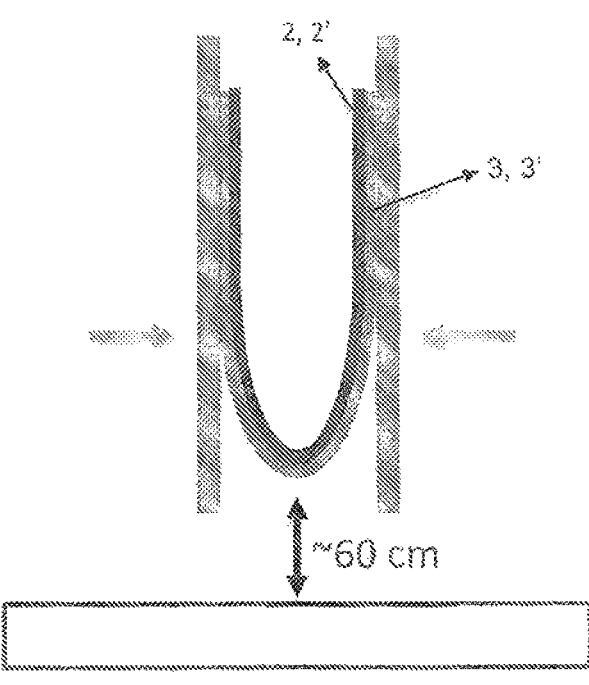
FIG. 2 is an illustrative view of test of the foldable cover article under 2 PB out folding.
Figure 3A:
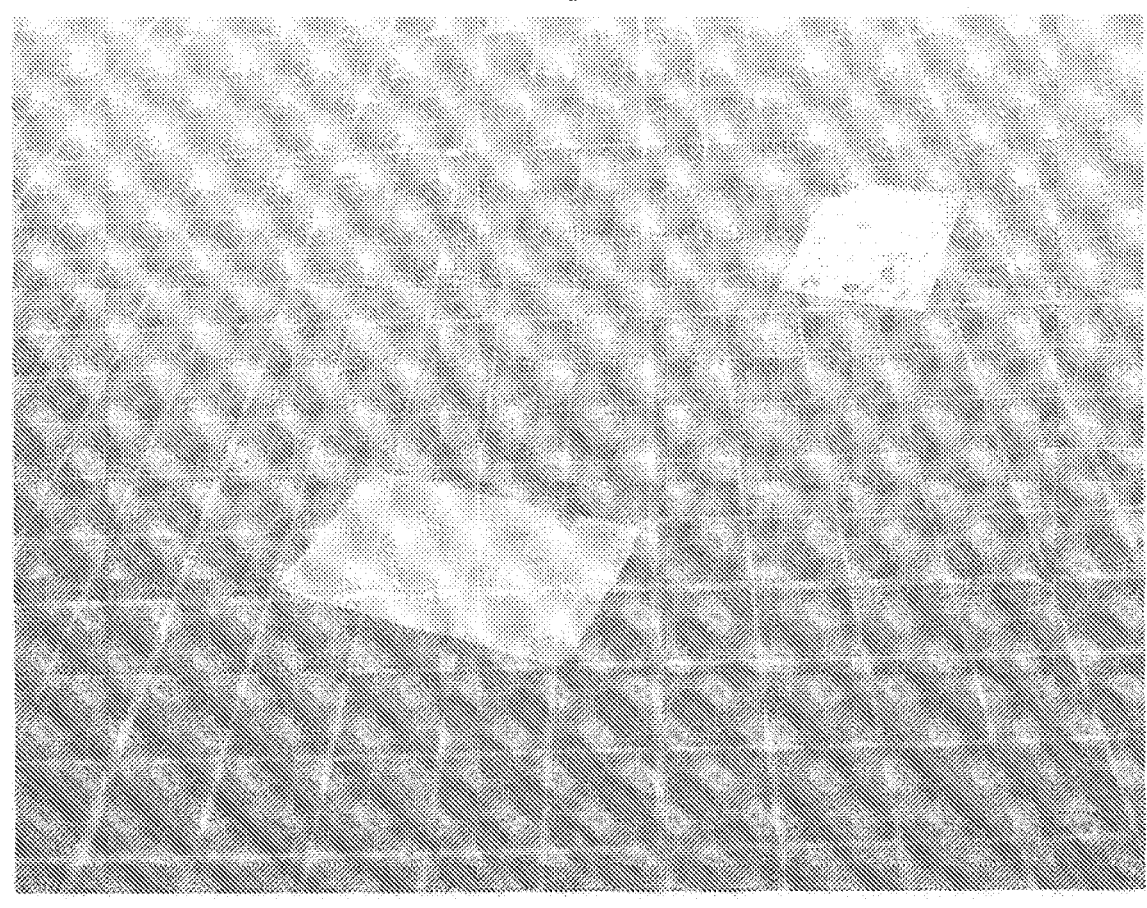
FIGS. 3a-3k are illustrative views of the Examples 1 to 10 of foldable cover articles shown in FIGS. 1a-1j broken upon 2PB out-folding.
Figure 3B:
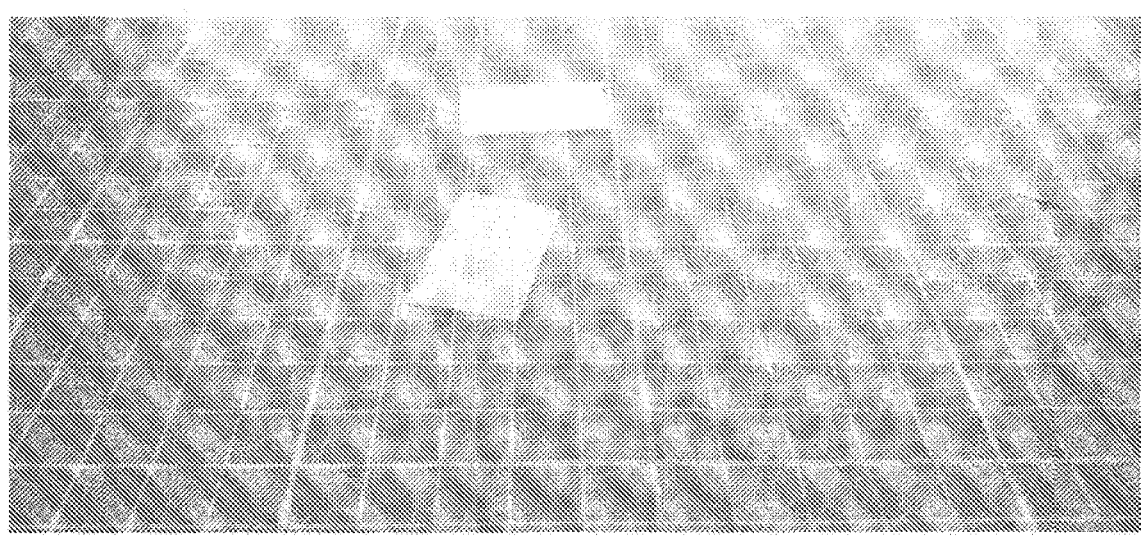
Figure 3C:
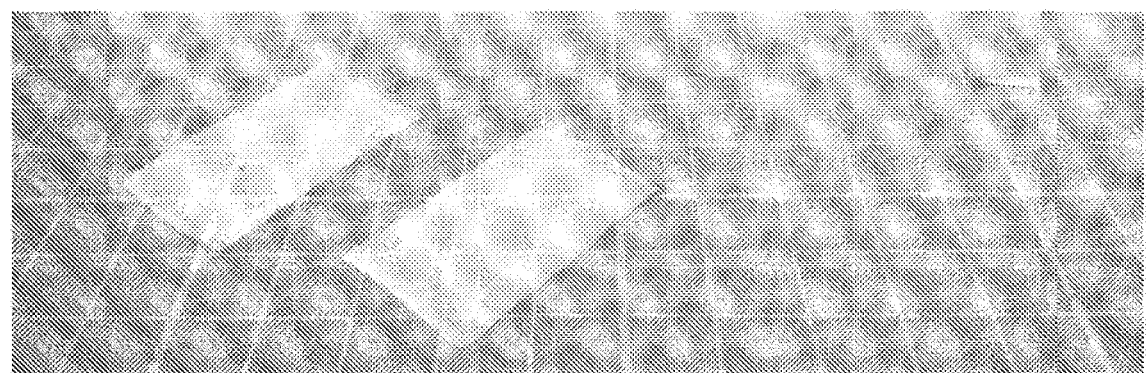
Figure 3D:
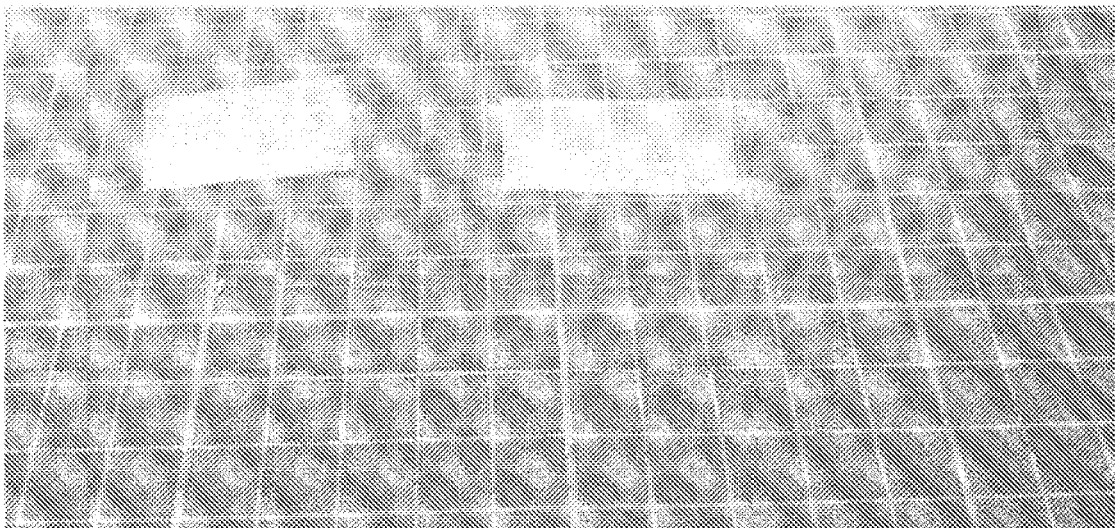
Figure 3E:
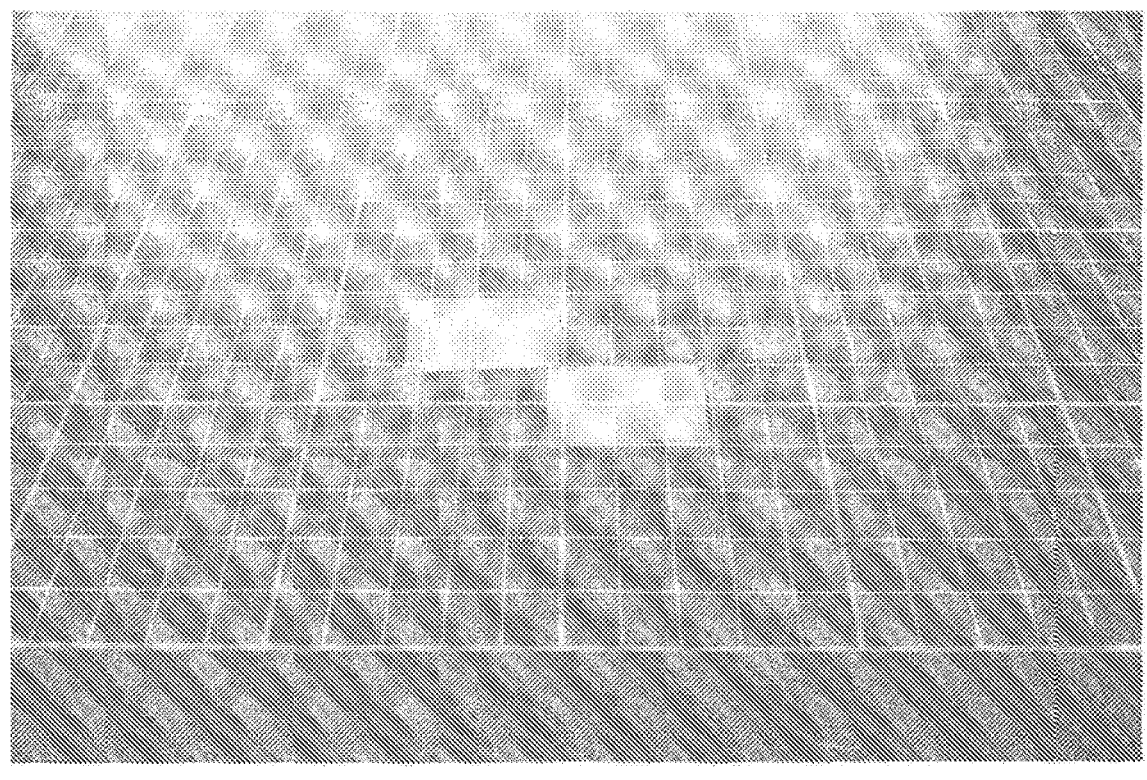
Figure 3F:
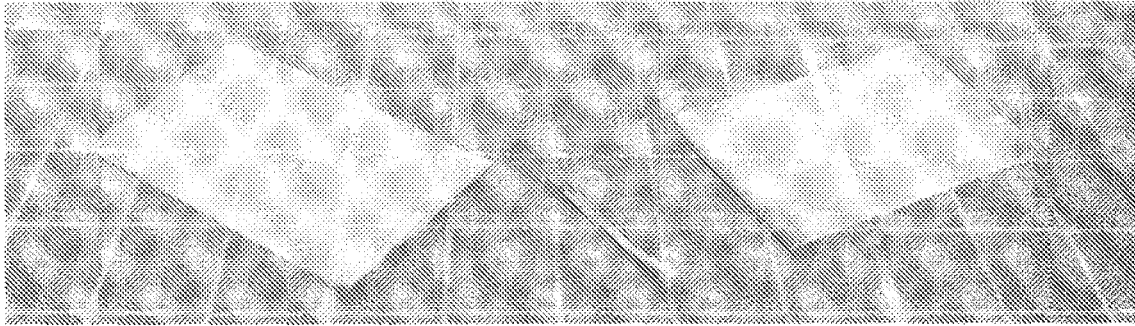
Figure 3G:
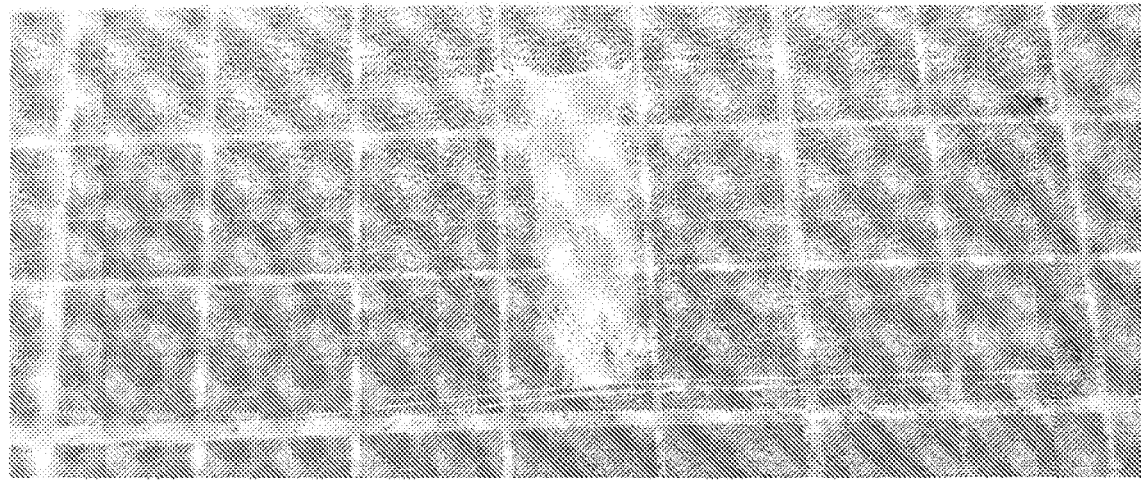
Figure 3H:
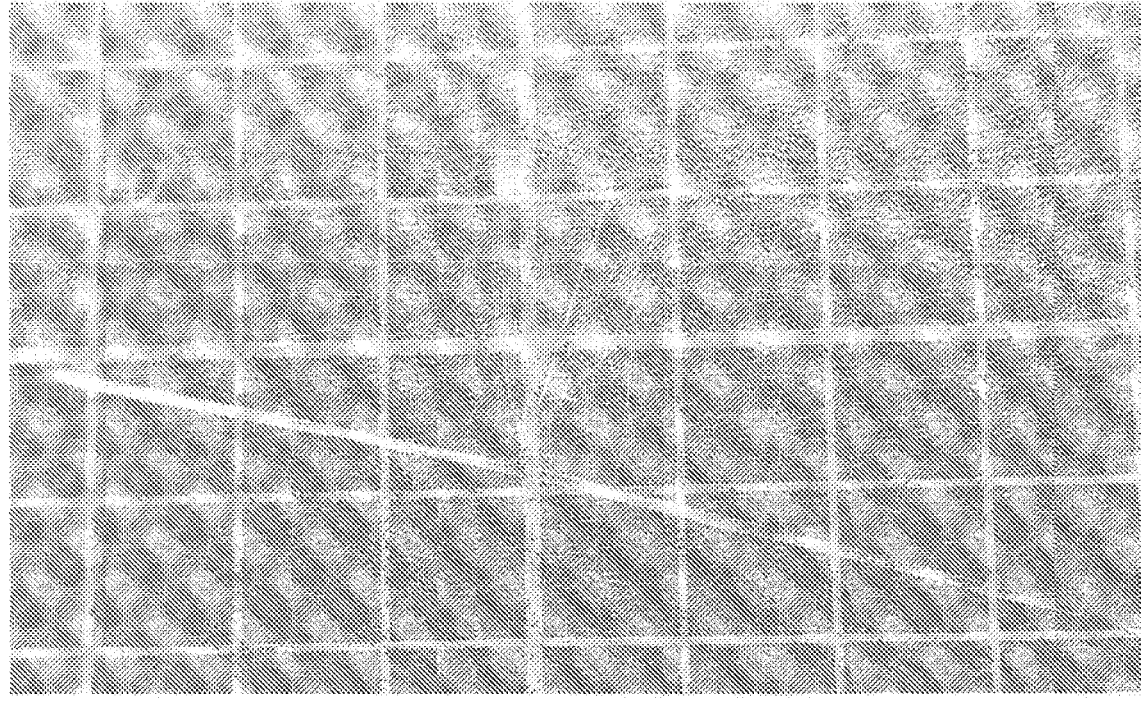
Figure 3I:
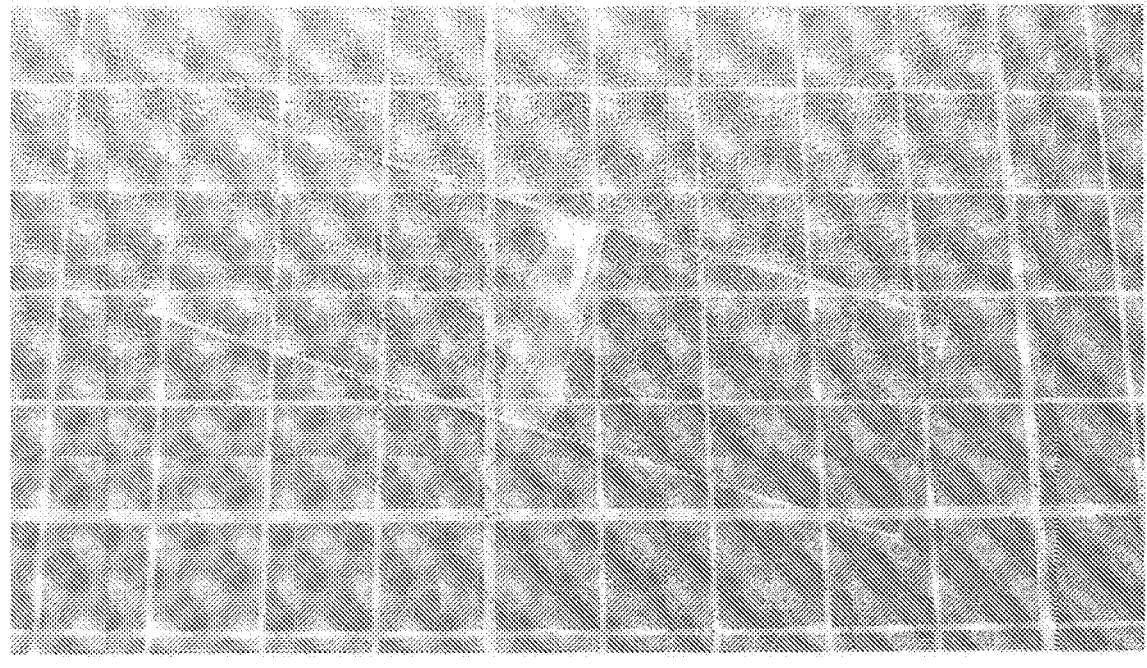
Figure 3J:
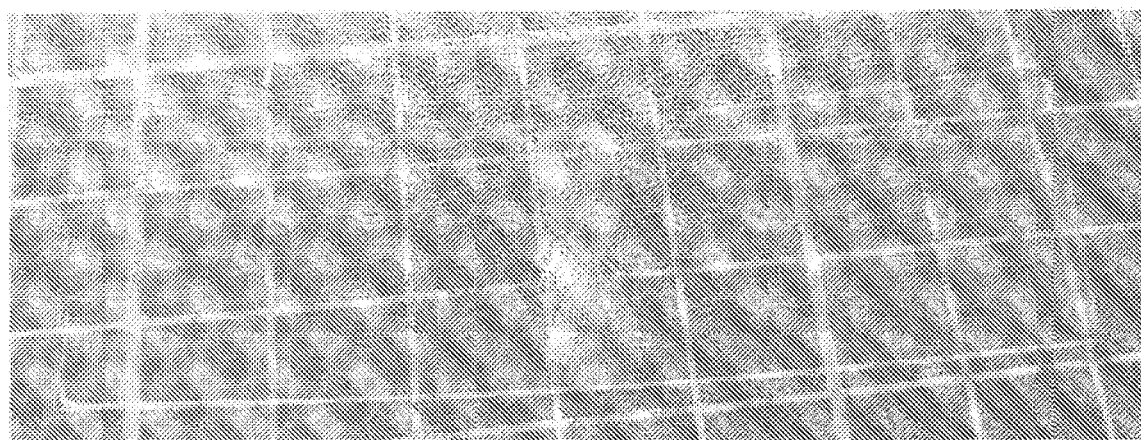
Figure 3K:
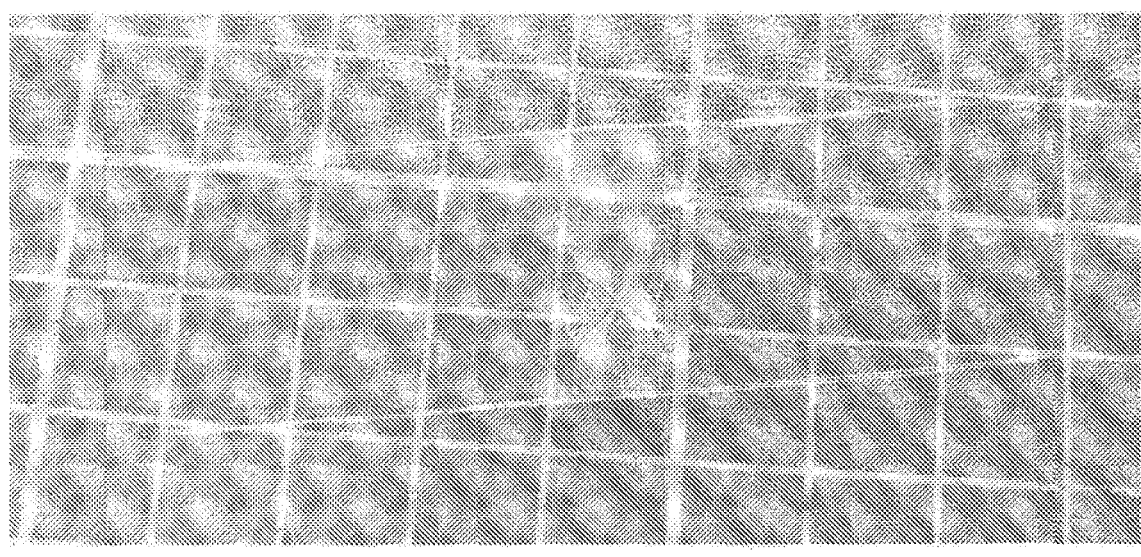
Figure 4A:
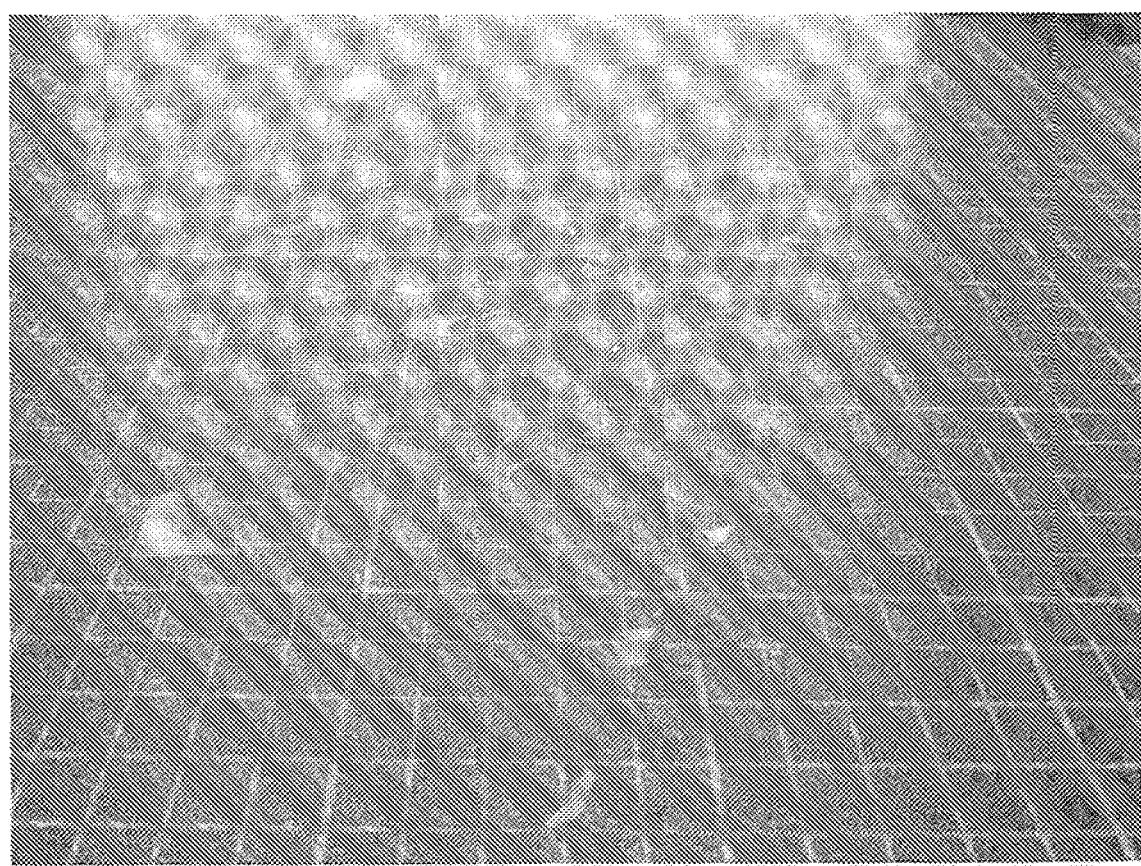
FIGS. 4a-4c are illustrative views of the Comparative Examples 1 to 3 of foldable cover articles shown in FIGS. 1k-1m broken upon 2PBd out-folding.
Figure 4B:
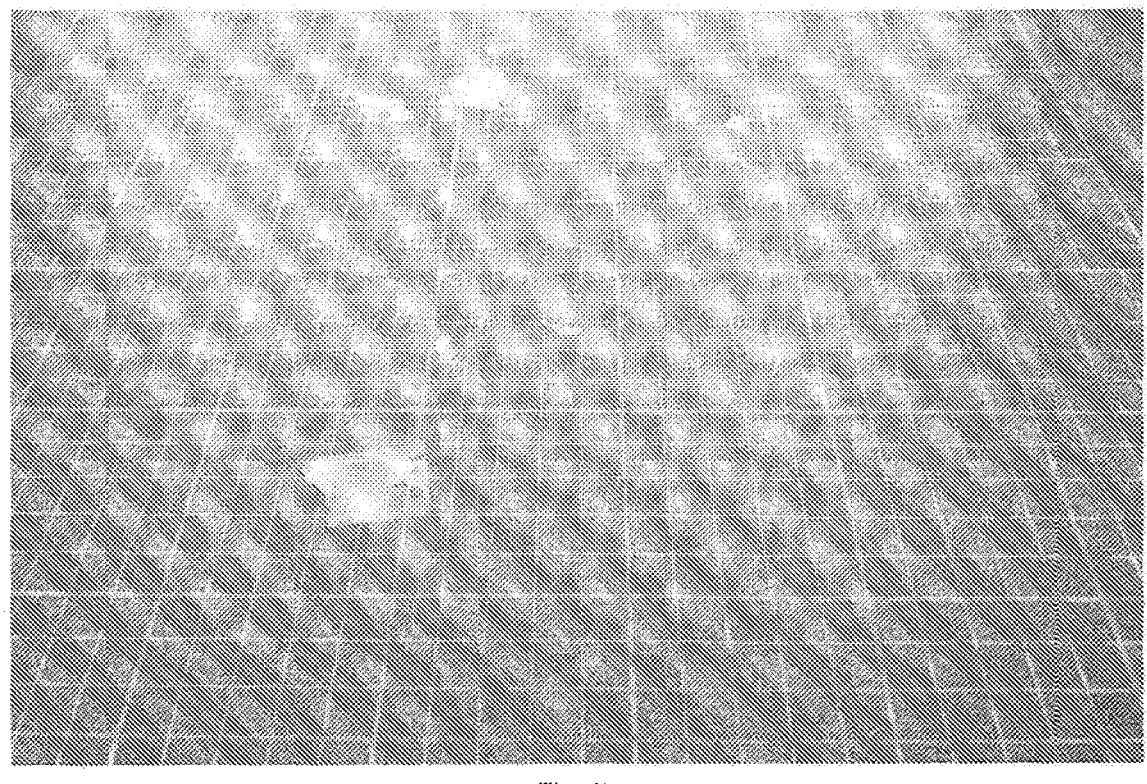
Figure 4C:
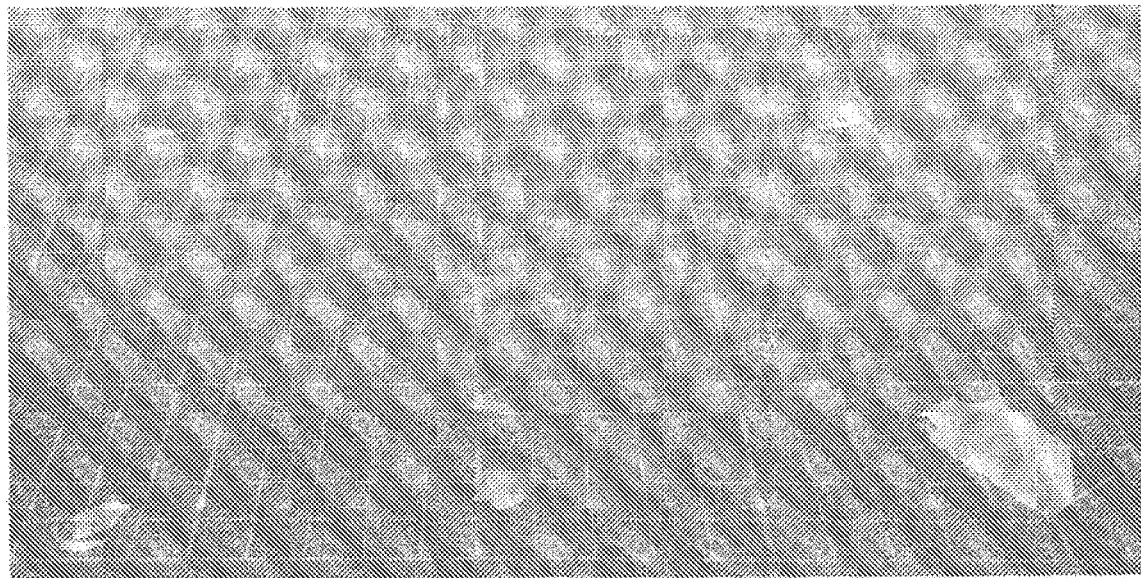

FIG. 2 shows the illustrative view of test of the foldable cover article 1, 1' broken under 2 PB out folding. This test is performed with two fixtures clamping the foldable cover article 1, 1' with the polymer layer/coating facing towards the fixtures. In case that the glass substrate 1, 1' are applied with the polymer layers and/or coatings on both side thereof, when bending, the side with larger thickness of the polymer layer(s) and/or coating(s) faces toward the fixtures. In this test, the fixtures are place 60 cm above cutting platform with 1 cm*1 cm grids, the result of which are shown in FIGS. 3*a*-3*k* and 4*a*-4*c* respectively with respect to a sample of 20 mm*70 mm*0.07 mm of the foldable cover article 1, 1' shown in FIGS. 1*a*-1*m*. From FIGS. 3*a*-3*k* and FIGS. 4*a*-4*c*, it can be determined that when the thickness of the polymer layer and/or coating is large, the number of projections resulted from break after 2PB out folding is small. In detail, the specific numbers of the projections for Examples 1 to 10 and Comparative Examples 1 to 3 are listed in Table 1.

TABLE 1

| No. | Number of projections ≥5 mm | Number of projections <5 mm |
| --- | --- | --- |
| Example 1 | ~5 | ~20 |
| Example 2 | ~5 | ~28 |
| Example 3 | ~3 | ~17 |
| Example 4-1 | 3 | ~23 |
| Example 4-2 | 4 | ~32 |
| Example 5 | ~3 | 0 |
| Example 6 | 1 | 0 |
| Example 7 | 1 | 0 |
| Example 8 | 1 | 0 |
| Example 9 | 1 | 0 |
| Example 10 | 1 | 0 |
| Comparative Example 1 | ~30 | >100 |
| Comparative Example 2 | ~15 | ~60 |
| Comparative Example 3 | ~12 | ~60 |

Test 2: 2PB In-Folding

Figure 5:
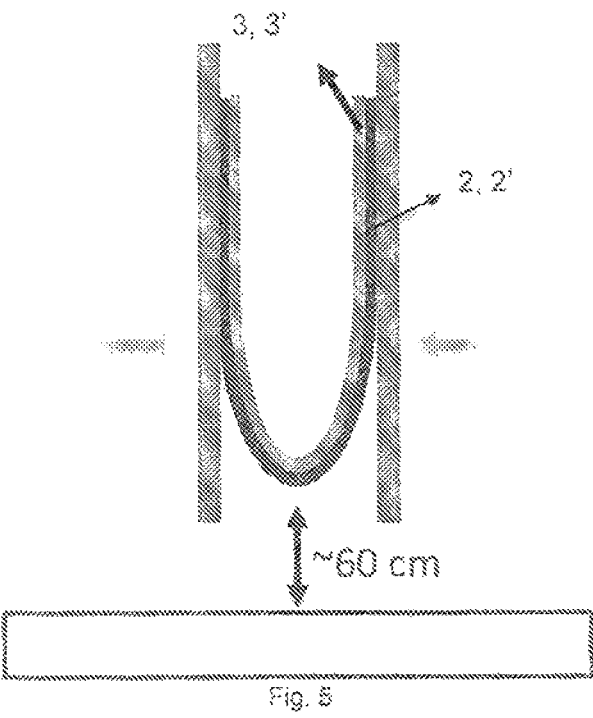
FIG. 5 is an illustrative view of test of the foldable cover article under 2PB in folding.
Figure 6A:
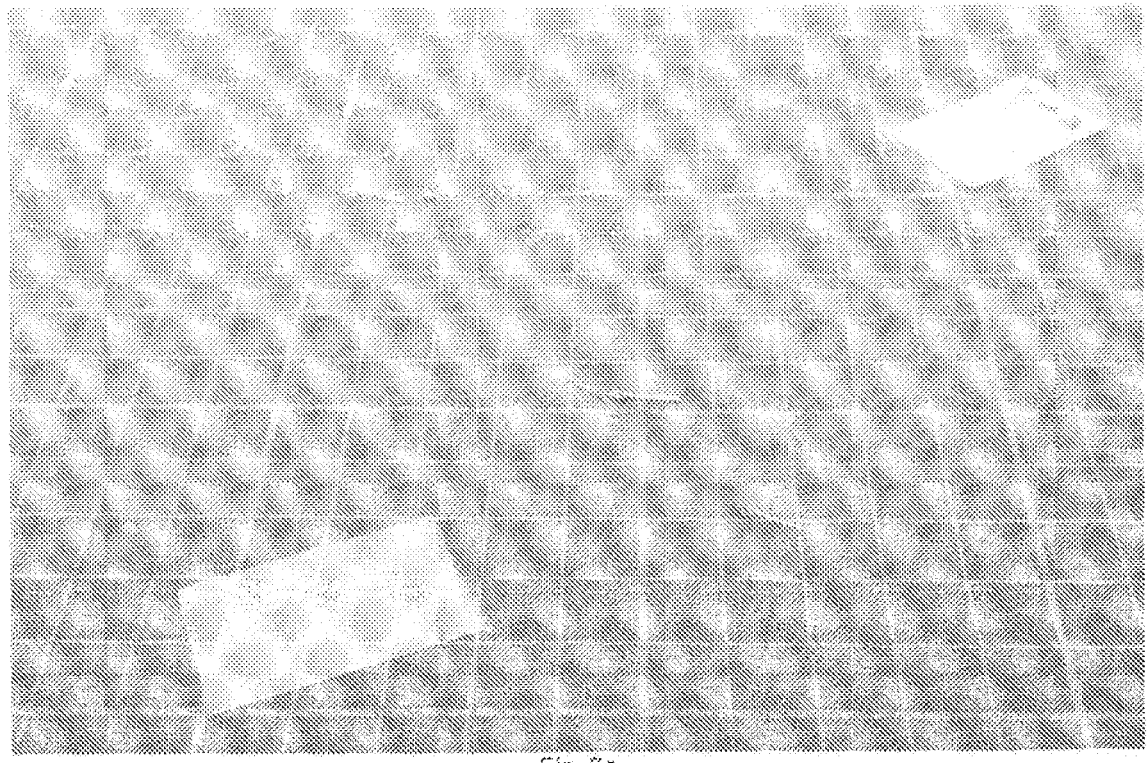
FIGS. 6*a*-6*k* are illustrative views of the Examples 1 to 10 of foldable cover articles shown in FIGS. 1*a*-1*j* broken upon 2PB in-folding.
Figures 6B, 6C:
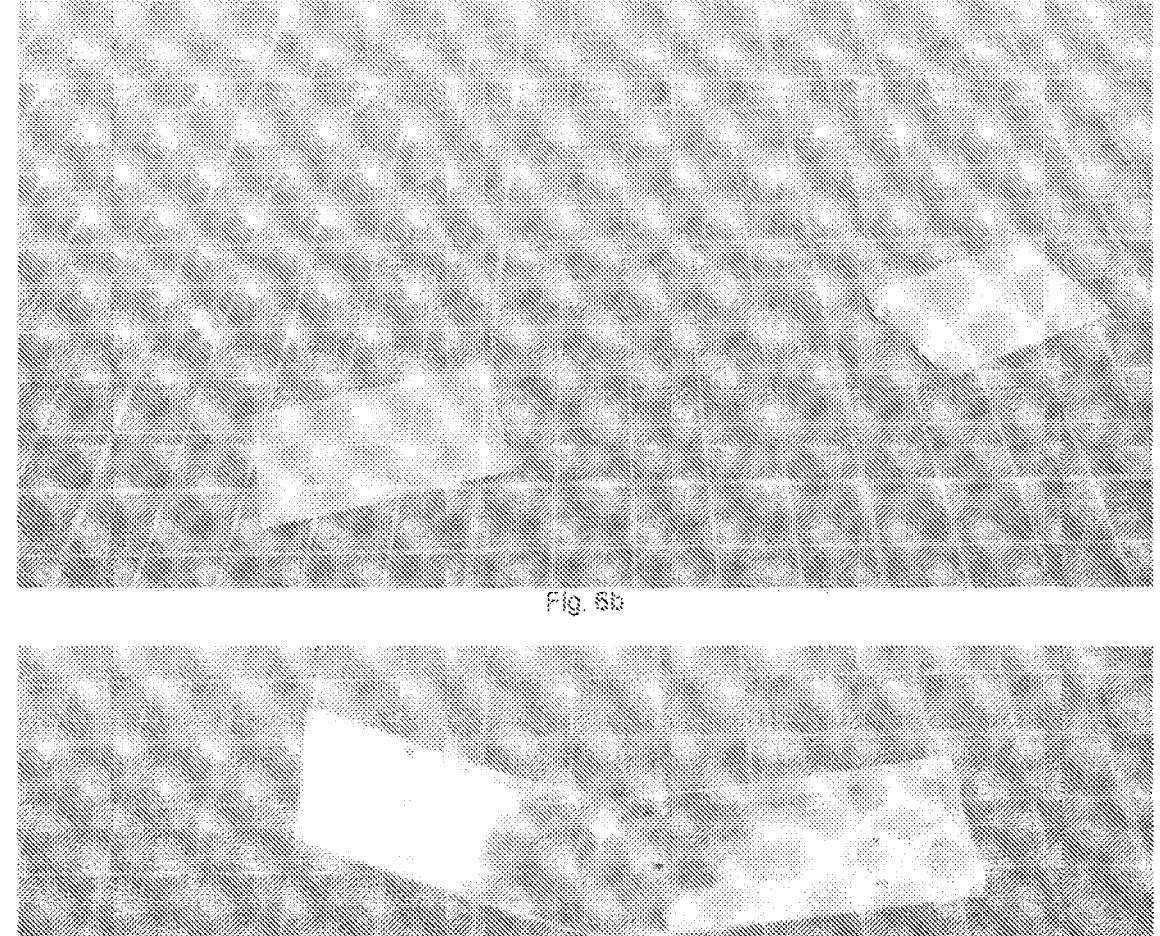
Figure 6D:
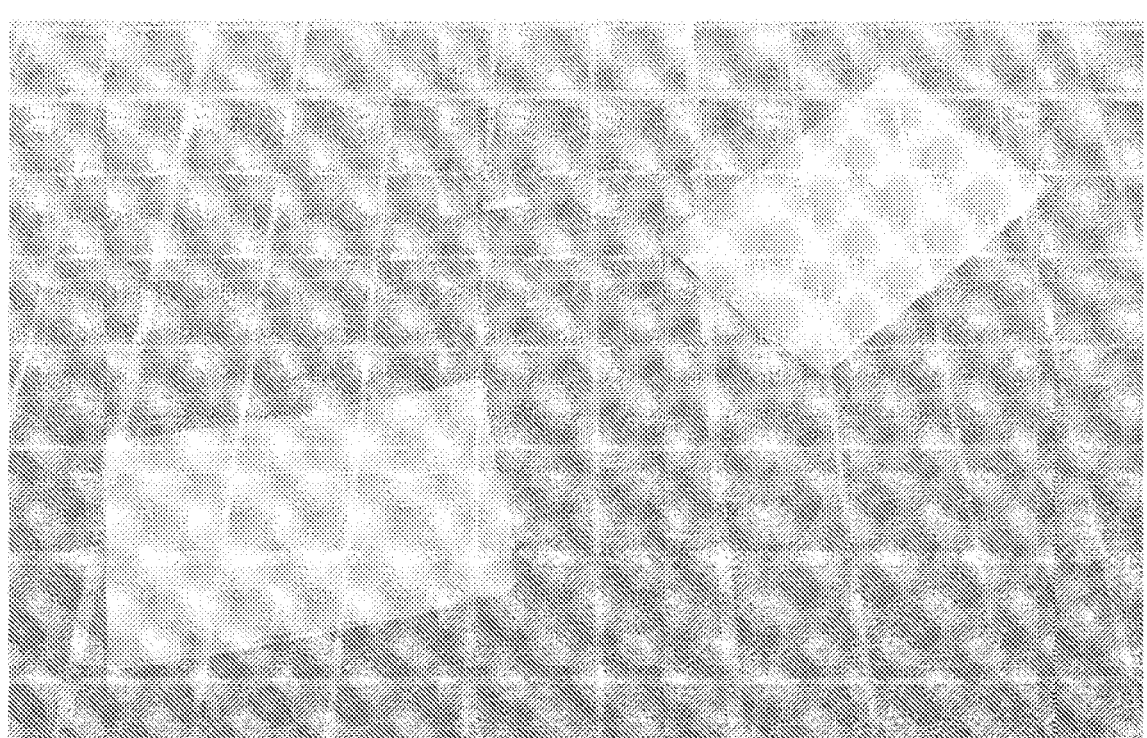
Figure 6E:
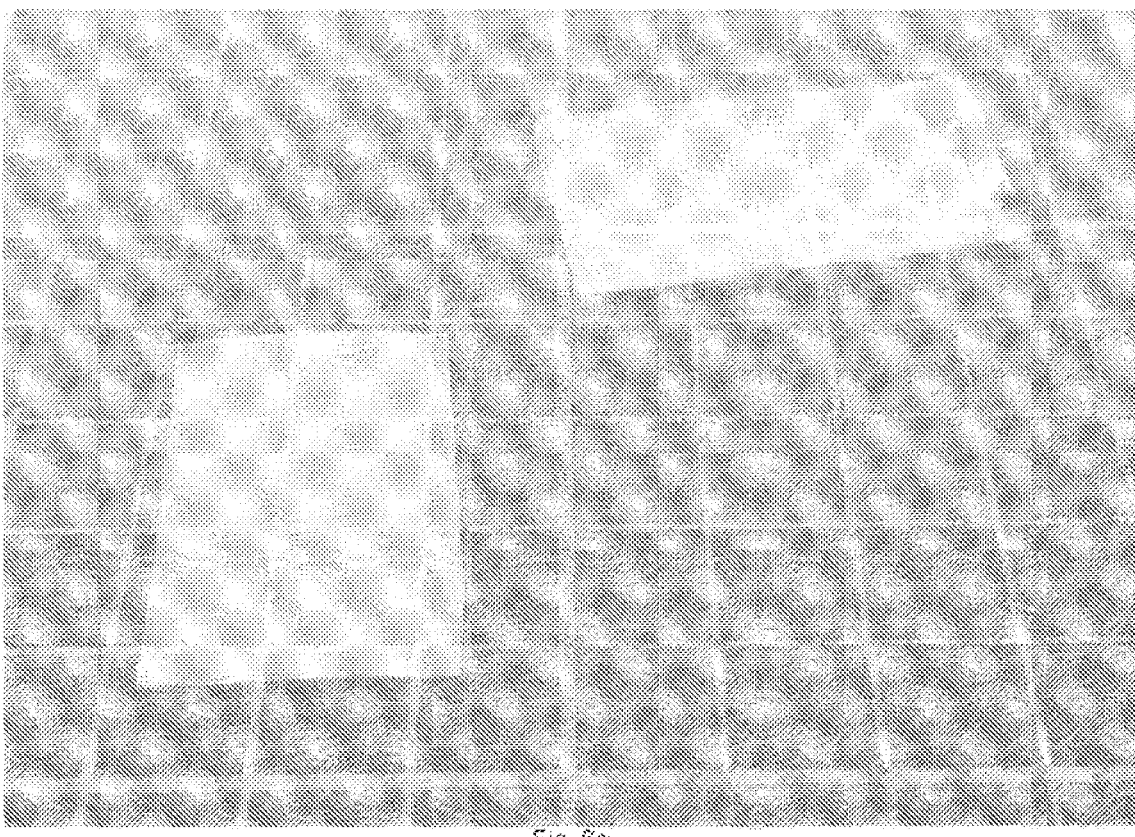
Figures 6F, 6G:
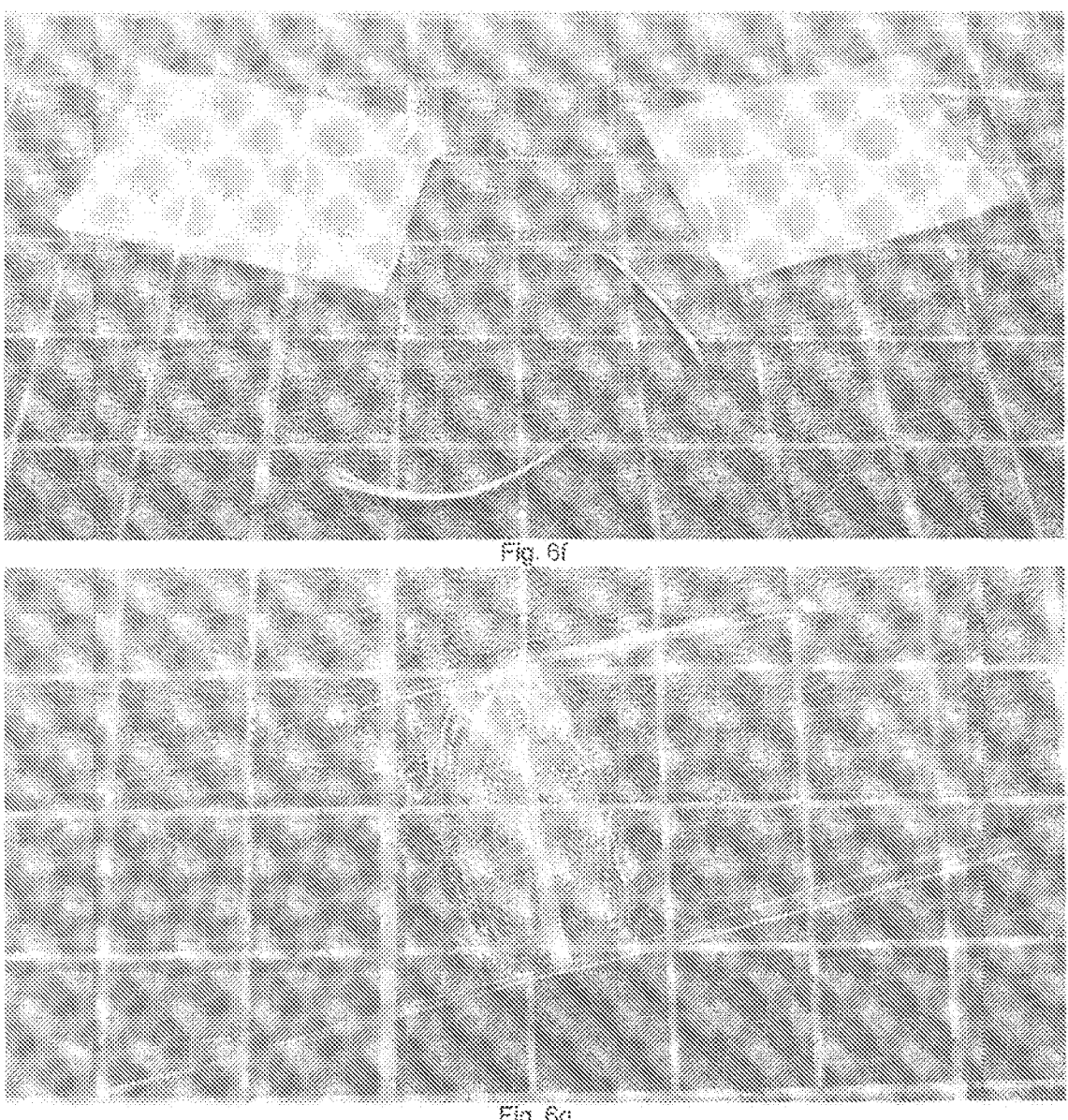
Figures 6H, 6I:
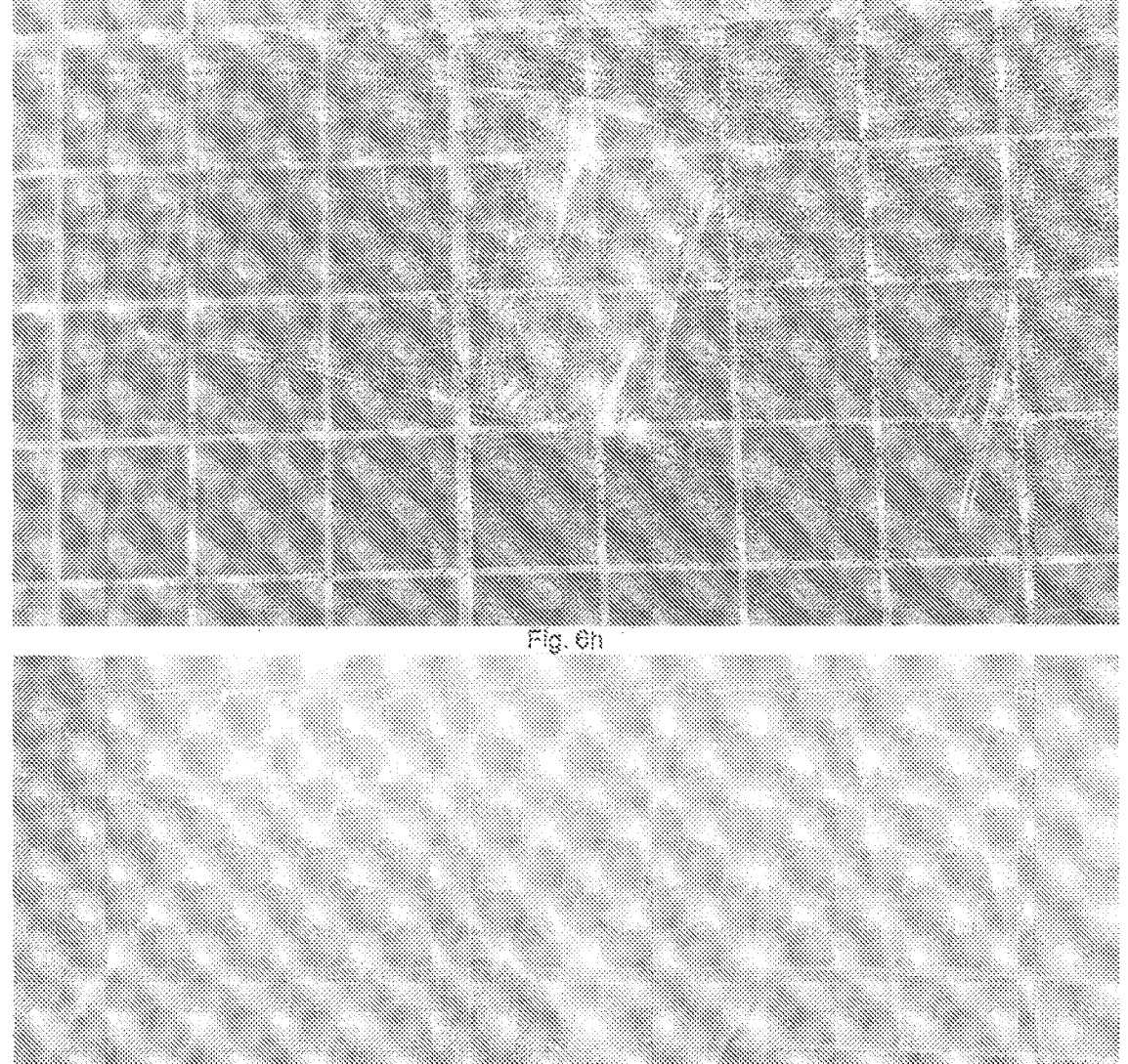
Figures 6J, 6K:
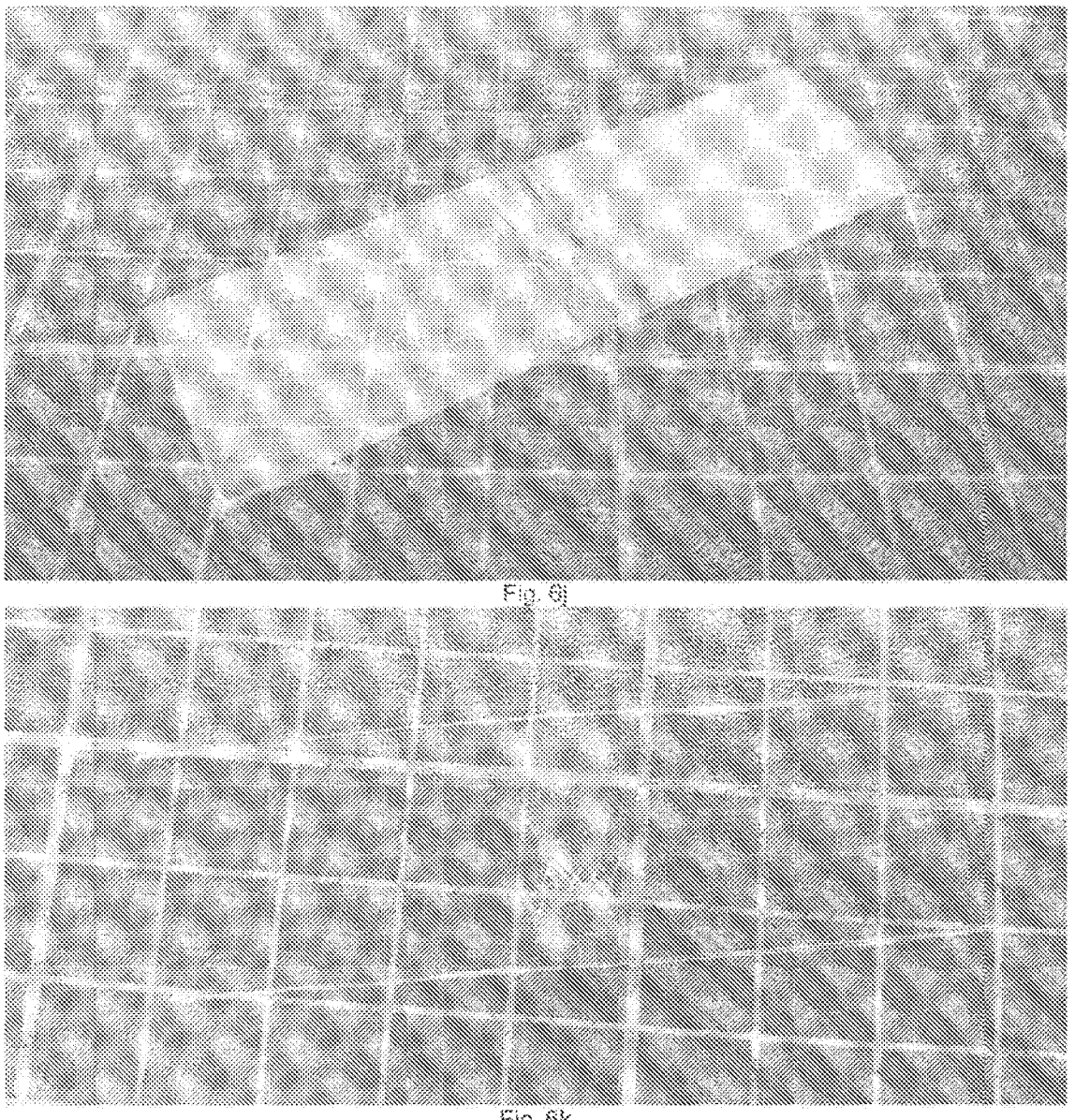
Figure 7A:
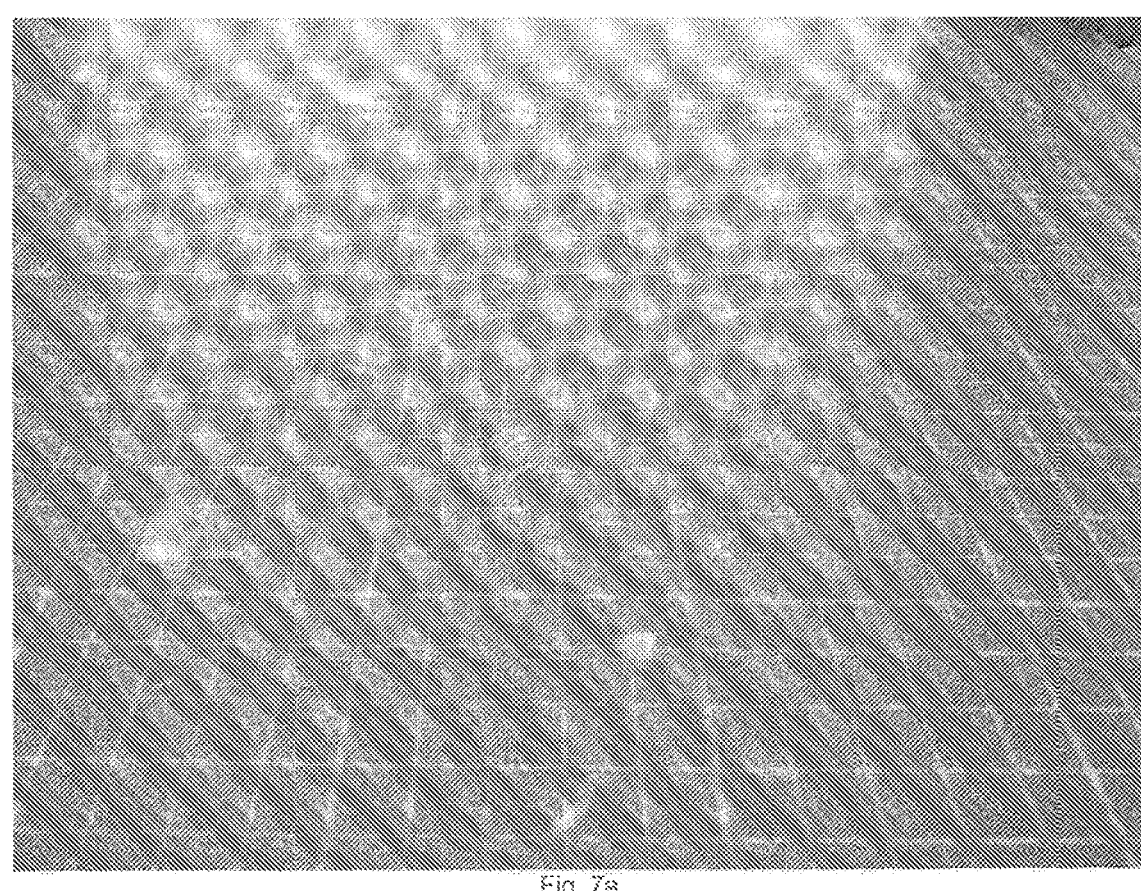
FIGS. 7*a*-7*c* are illustrative views of the Comparative Examples 1 to 3 of the foldable cover articles shown in FIGS. 1*k*-1*m* broken upon 2PB in-folding.
Figure 7B:
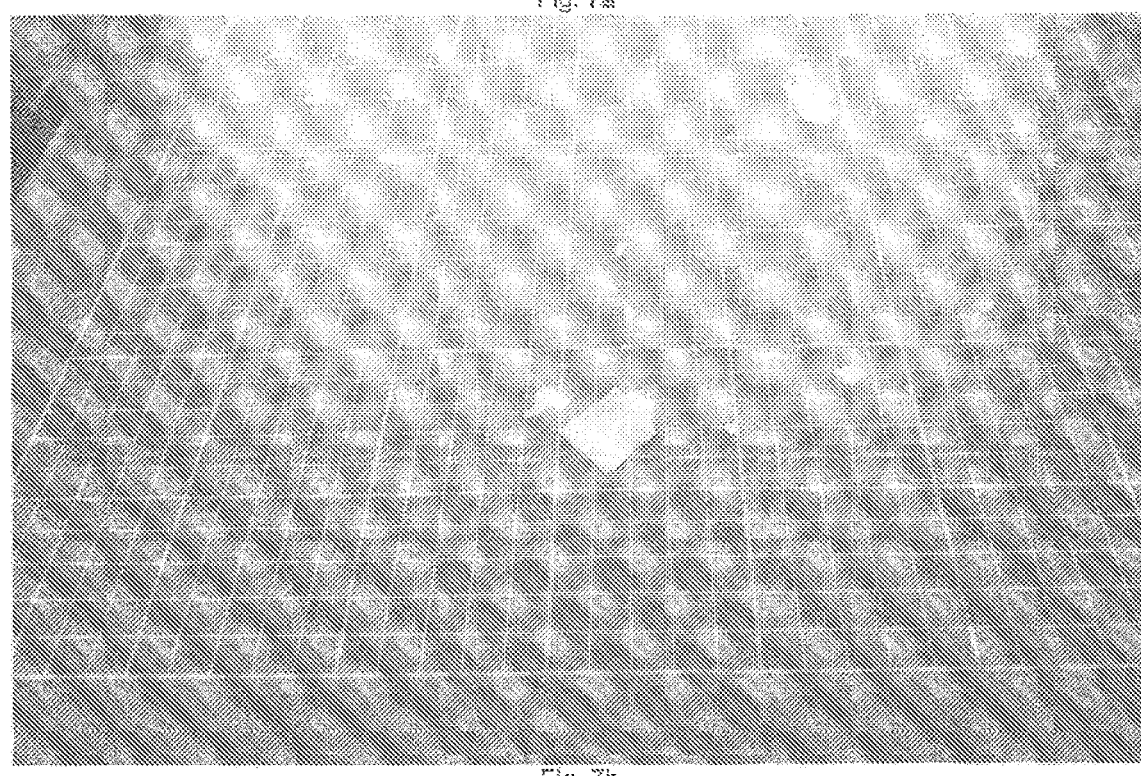
Figure 7C:
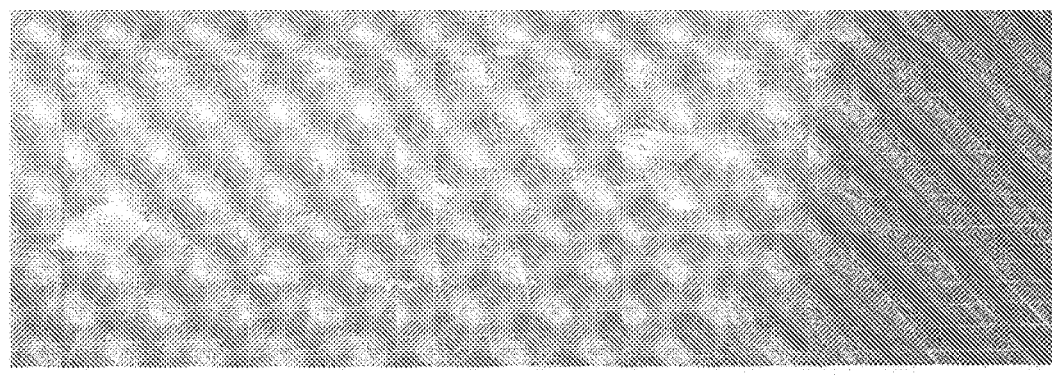

FIG. 5 shows the illustrative view of test of the foldable cover article 1, 1' under 2PB in folding. This test is performed with two fixtures clamping the foldable cover article 1, 1' with the glass substrate facing towards the fixtures. In case that the glass substrate 1, 1' are applied with the polymer layers and/or coatings on both sides thereof, when bending, the side with smaller thickness of the polymer layer(s) and/or coating(s) faces toward the fixtures. In this test, the fixtures are place 60 cm above cutting platform with 1 cm*1 cm grids, the result of which are shown in FIGS. 6*a*-6*k* and FIGS. 7*a*-7*c* respectively with respect to a sample of 20 mm*70 mm*0.07 mm of the foldable cover article 1, 1' shown in FIGS. 1*a*-1*m*. From FIGS. 6*a*-6*k* and FIGS. 7*a*-7*c*, it can be determined that when the thickness of the polymer layer and/or coating is large, the number of projections resulted from break after 2PB out folding is small. In detail, the specific numbers of the projections for Examples 1 to 10 and Comparative Examples 1 to 3 are listed in Table 2.

TABLE 2

| No. | Number of projections ≥5 mm | Number of projections <5 mm |
| --- | --- | --- |
| Example 1 | ~6 | ~31 |
| Example 2 | ~6 | ~37 |
| Example 3 | 1 | ~33 |
| Example 4-1 | 4 | ~28 |
| Example 4-2 | 5 | ~41 |
| Example 5 | ~4 | ~12 |

TABLE 2-continued

| No. | Number of projections ≥5 mm | Number of projections <5 mm |
|---|---|---|
| Example 6 | 1 | ~7 |
| Example 7 | 1 | 0 |
| Example 8 | 1 | 12 |
| Example 9 | 1 | ~13 |
| Example 10 | 1 | 0 |
| Comparative Example 1 | ~30 | >100 |
| Comparative Example 2 | ~20 | >100 |
| Comparative Example 3 | ~116 | >100 |

Test 3: Out Folding Pen Drop

Figure 8:
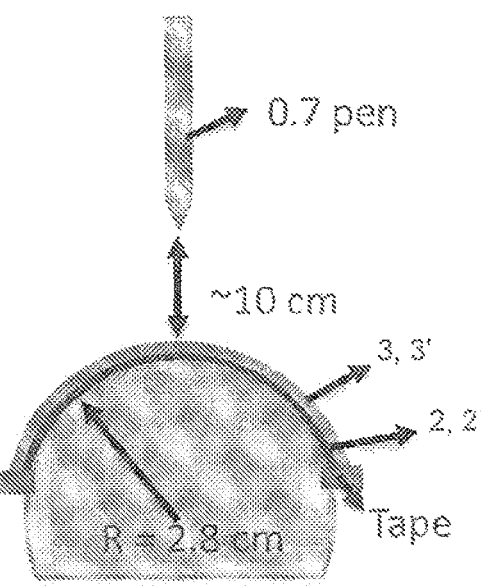
FIG. 8 is an illustrative view of the test of the foldable cover article under out-folding pen drop.
Figure 9A:
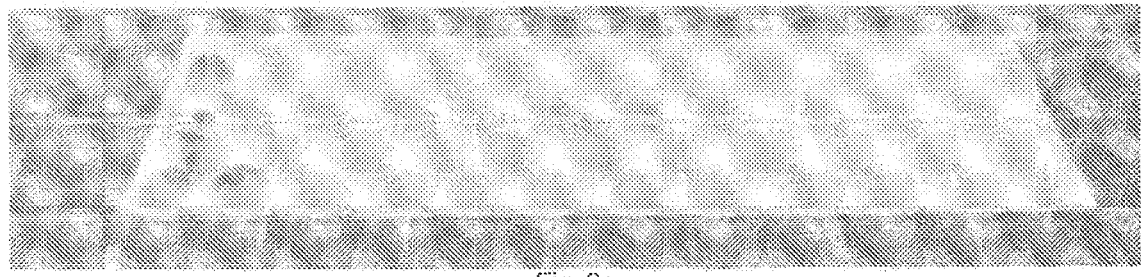
FIGS. 9*a*-9*k* are illustrative views of the Examples 1 to 10 of foldable cover articles shown in FIGS. 1*a*-1*j* upon out-folding pen drop.
Figures 9B, 9C, 9D, 9E, 9F:
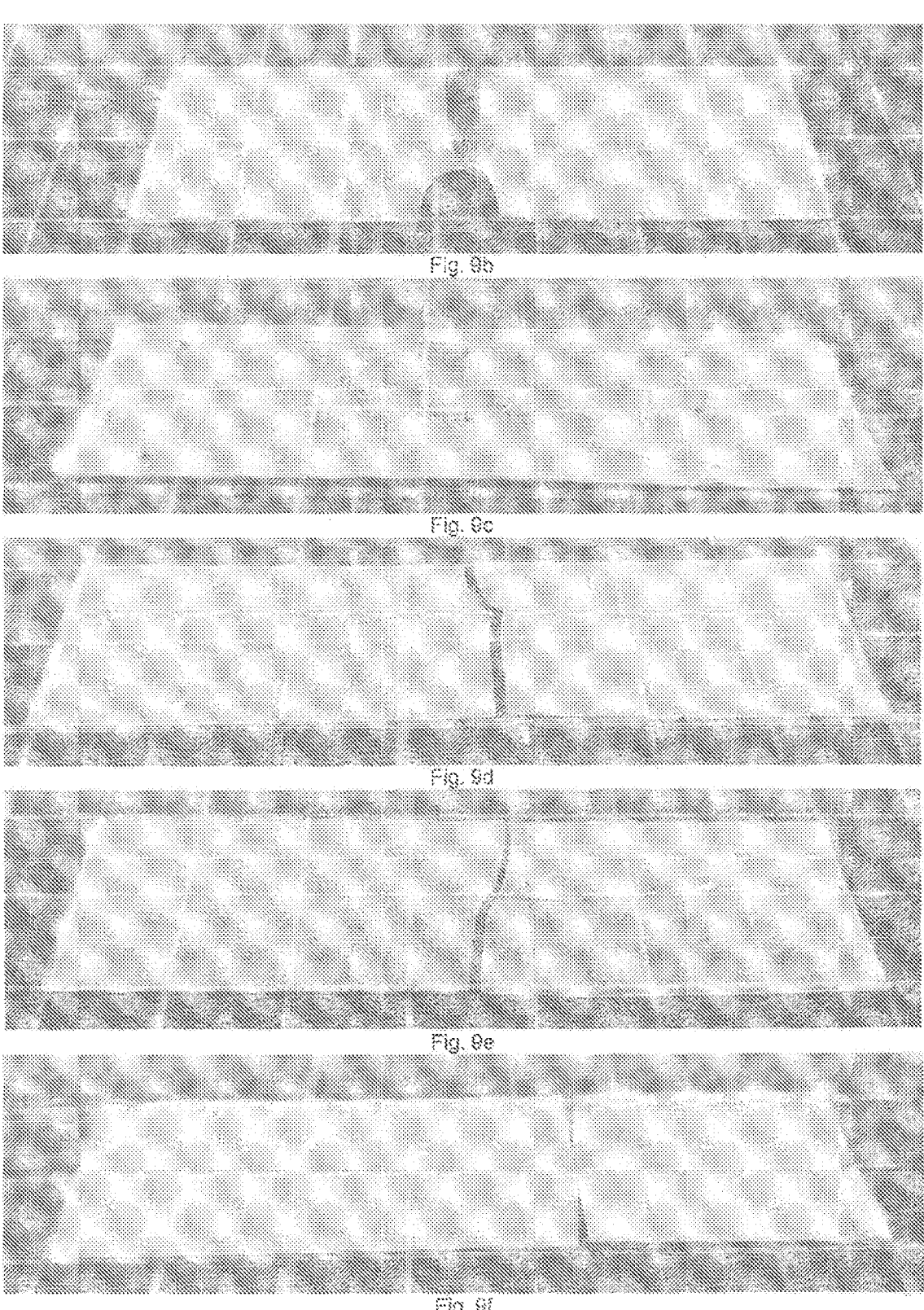
Figures 9G, 9H, 9I, 9J:
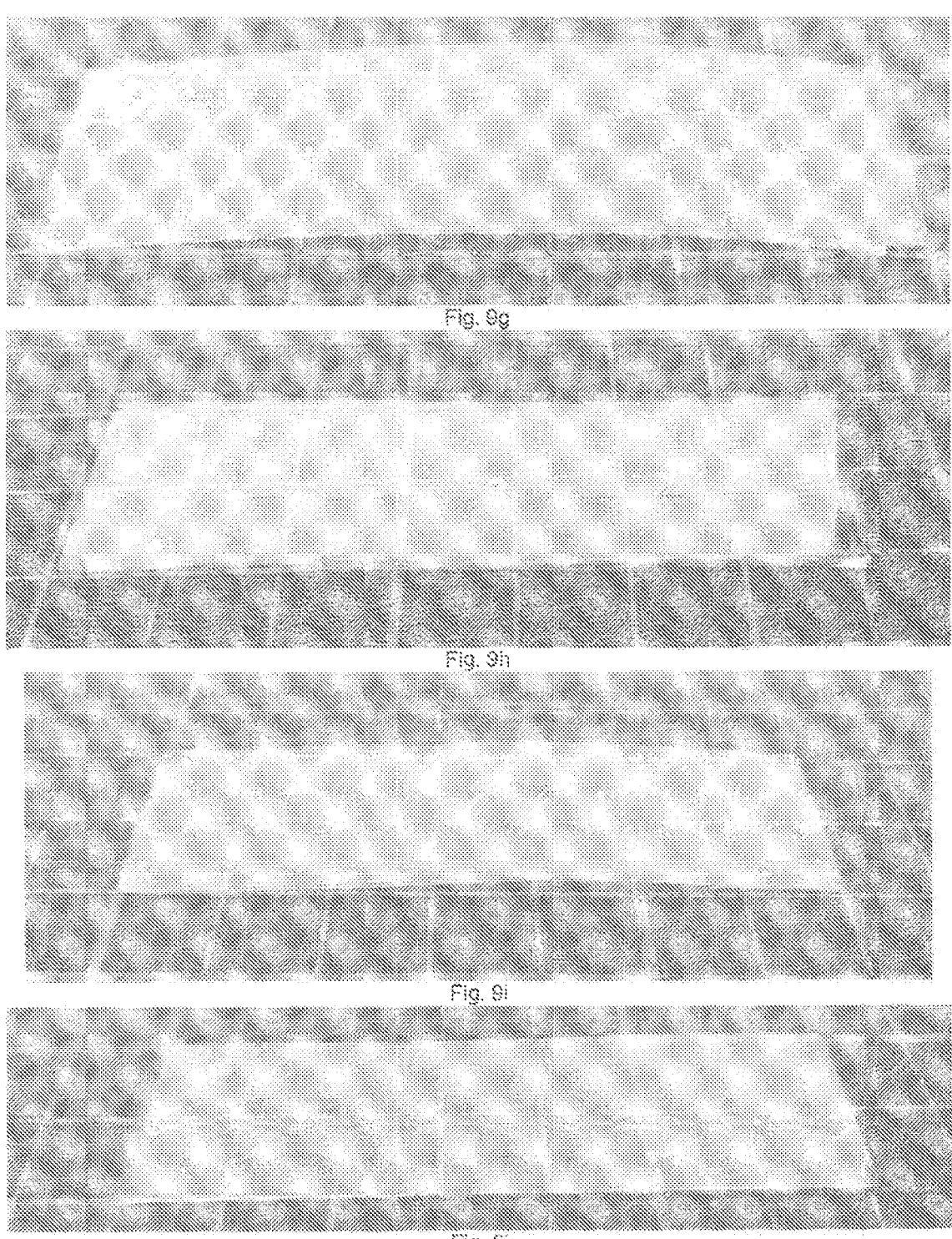
Figures 9K, 10A, 10B, 10C:
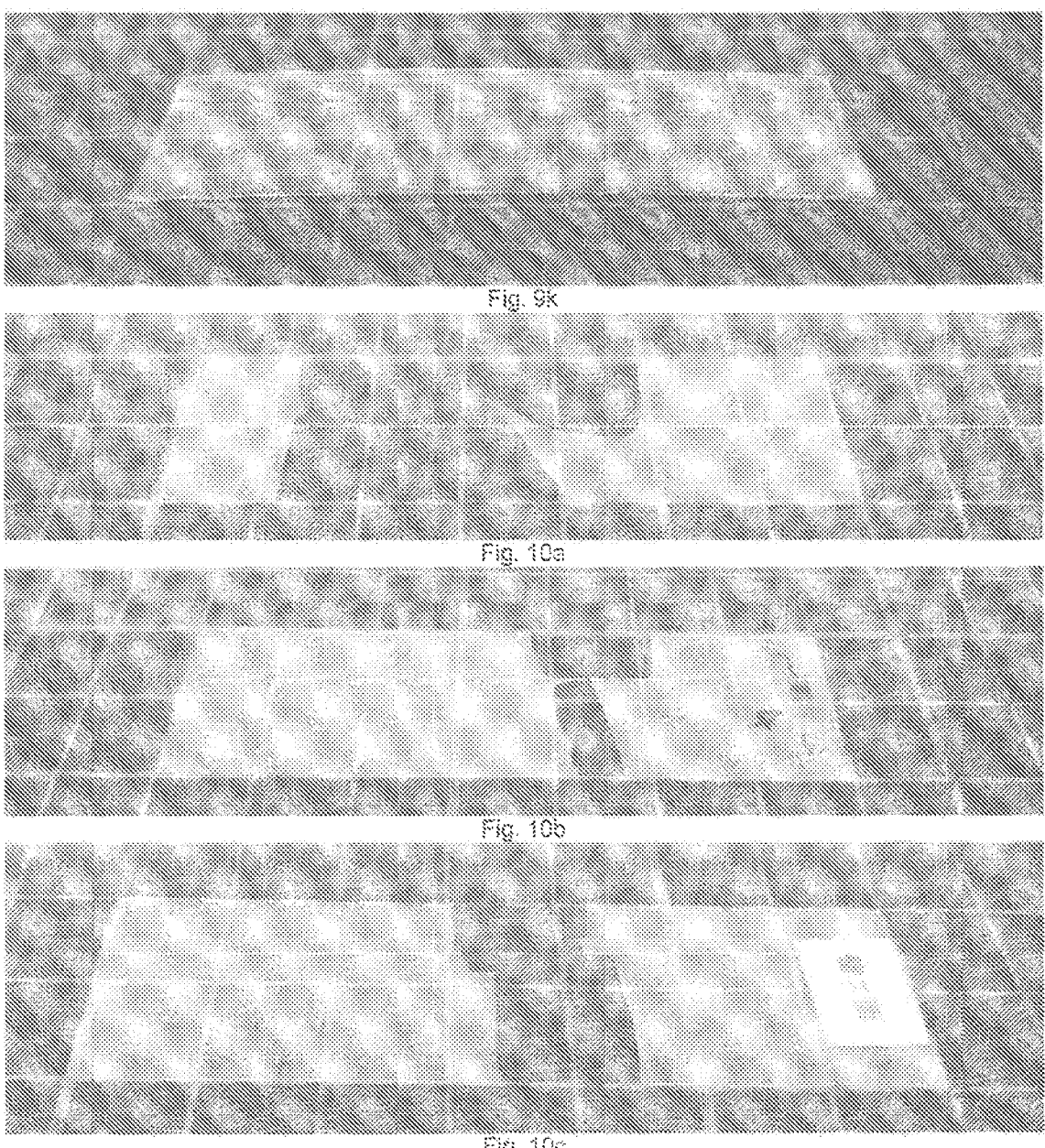
FIGS. 10*a*-10*c* are illustrative views of the Comparative Examples 1 to 3 of the foldable cover articles shown in FIGS. 1*k*-1*m* broken upon out-folding pen drop.

FIG. 8 shows the illustrative view of test of the foldable cover article 1, 1' under out folding pen drop. This test is performed with a pen of 6 g weight and 0.7 mm length dropped from 10 cm height onto a sample of the foldable cover article 1, 1' with the polymer layer and/or coating facing towards the pen, which is fixed on a roller with a radius of 2.8 cm with two ends of the sample fixed by two tape of 3 mm length. In case that the glass substrate 1, 1' are applied with the polymer layers and/or coatings on both sides thereof, the side with larger thickness of the polymer layer(s) and/or coating(s) faces toward the pen. In this test, it is difficult to collect the tiny pieces, so the two ends of the sample attached to the tape were collected and weighted after the test. Weight loss is defined as:

$$\text{Weight loss} = \frac{\text{initial weight} - \text{remaining weight}}{\text{initial weight}} \times 100\%.$$

The results of test are shown in FIGS. 9*a*-9*k* and FIGS. 10*a*-10*c* respectively with respect to a sample of the foldable cover article 1, 1' shown in FIGS. 1*a*-1*m*. From FIGS. 9*a*-9*k* and FIGS. 10*a*-10*c*, it can be determined that when the thickness of the polymer layer and/or coating is large, the weight loss resulted from breakage after out folding pen drop is small. In detail, the specific weight loss for Examples 1 to 10 and Comparative Examples 1 to 3 are listed in Table 3.

TABLE 3

| No. | Weight loss (%) | Number of major cracks |
|---|---|---|
| Example 1 | 0 | ~11 |
| Example 2 | ~5 | / |
| Example 3 | 0 | ~22 |
| Example 4-1 | 0 | 15 |
| Example 4-2 | 0 | 21 |
| Example 5 | ~3 | / |
| Example 6 | ~0 | ~15 |
| Example 7 | 0 | 18 |
| Example 8 | 0 | 26 |
| Example 9 | 0 | 12 |
| Example 10 | 0 | 25 |
| Comparative Example 1 | ~45 | / |
| Comparative Example 2 | ~11 | / |
| Comparative Example 3 | ~16 | / |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A foldable cover article having a total thickness t≤300 μm, which is bendable to a minimum bending radius r≤20 mm without breakage and a pencil hardness HR≥HB, and comprises:

a glass or glass-ceramic substrate with a thickness 5 μm≤t1≤150 μm; and a polymer layer and a hard material coating with a total thickness t2 of the polymer layer and the hard material coating being 5 μm≤t2≤150 μm; wherein for each 20 mm width of the foldable cover article, when the foldable cover article is broken upon bending along the direction perpendicular to the width, a number of projections with a longest linear extension L≥5 mm is less than 10 and/or a number of projections with a longest linear extension L<5 mm is less than 50, wherein at least one surface of the glass or glass ceramic substrate is coated with the hard material coating or a multi-layer coating of the hard material coating having a total thickness t3c≥1 μm, and each layer of the hard material coating or the multi-layer coating of the hard material coating is made of poly (methyl methacrylate) (PMMA) with inorganic nanoparticles, wherein the polymer layer is disposed on a first side of the glass or glass-ceramic substrate and the hard material coating is exposed and disposed on a second side of the glass or glass-ceramic substrate that is opposite the first side.

2. The foldable cover article of claim 1, wherein the glass or glass-ceramic substrate is toughened and has a minimum bending radius r1 in millimeter r1≤100000*t1/CS, wherein CS is a compressive stress in MPa measured on both surfaces of the glass or glass-ceramic substrate.

3. The foldable cover article of claim 2, wherein CT≤700 MPa, wherein CT is a center tension in MPa in a middle plane of the glass or glass-ceramic substrate.

4. The foldable cover article of claim 2, wherein the glass or glass-ceramic substrate has a depth of ion-exchange layer DoL≥1 μm and/or DoL≤t1/2.

5. The foldable cover article of claim 2, wherein the glass or glass-ceramic substrate has a two point bending strength BS≥700 MPa.

6. The foldable cover article of claim 1, wherein the polymer layer comprises a single polymer layer or multiple polymer layers with a total thickness t3p≥1 μm and/or of t3p<150 μm.

7. The foldable cover article of claim 6, wherein the polymer layer or multiple polymer layers have a Young's modulus Ep≤10 GPa and/or Ep≥0.1 GPa.

8. The foldable cover article of claim 6, wherein the polymer layer or multiple polymer layers are made of a polymer selected from the group consisting of Parylene, thermoplastic polyurethane (TPU), polycarbonate (PC), polysulfone (PS), polyethersulfone (PES), polyetheretherketone (PEEK), polyamide (PA), polyamideimide (PAI), polyimide (PI), poly(methyl methacrylate) (PMMA), polyimethylsiloxane (PDMS), and combinations thereof.

9. The foldable cover article of claim 1, wherein t3c<150 μm.

10. The foldable cover article of claim 9, wherein the hard material coating or multiple hard material coatings have a Young's modulus Eh≥1 GPa and/or Eh≤15 GPa.

11. The foldable cover article of claim 9, wherein the hard material coating or multiple hard material coatings are further made of at least one of an organic polymer material, an acrylate, a modified form of acrylate, an inorganic-organic hybrid polymer material, a polysiloxane, a modified form of polysiloxane, or an epoxy-siloxane hybrid.

12. The foldable cover article of claim 1, wherein the foldable cover article has a pencil hardness less than 8H on a side laminated with the polymer layer and the hard material coating.

13. The foldable cover article of claim 1, wherein the polymer layer comprises a layer of polyethylene terephthalate (PET).

14. The foldable cover article of claim 13, wherein the polymer layer comprises multiple polymer layers, wherein one of the multiple polymer layers comprises PET and one of the multiple polymer layers comprises an acrylate.

15. A foldable cover article having a total thickness t≤300 µm, which is bendable to a minimum bending radius r≤20 mm without breakage and a pencil hardness HR≥HB, and comprises:

a glass or glass-ceramic substrate with a thickness 5 µm≤t1≤150 µm; and a hard material coating applied to a first surface of the glass or glass-ceramic substrate, the hard material coating or a multi-layer coating of the hard material coating having a total thickness t3c≥1 µm; wherein for each 20 mm width of the foldable cover article, when the foldable cover article is broken upon bending along the direction perpendicular to the width, a number of projections with a longest linear extension L≥5 mm is less than 10 and/or a number of projections with a longest linear extension L<5 mm is less than 50, each layer of the hard material coating or the multi-layer coating of the hard material coating comprising poly (methyl methacrylate) (PMMA), wherein the hard material coating is an exposed material layer; and an adhesive layer applied to a second surface of the glass or glass-ceramic substrate that is opposite the first surface.

16. The foldable cover article of claim 15, wherein each layer of the hard material coating or the multi-layer coating of the hard material coating comprises PMMA with inorganic nanoparticles.

17. The foldable cover article of claim 15, wherein the adhesive layer comprises an optical clear adhesive.

18. The foldable cover article of claim 15, further comprising a polymer layer, the adhesive layer being sandwiched between the polymer layer and the glass or glass-ceramic substrate.

19. The foldable cover article of claim 15, wherein the total thickness t3c is no more than 150 µm.

* * * * *